United States Patent
Churnock et al.

(10) Patent No.: US 9,939,790 B1
(45) Date of Patent: Apr. 10, 2018

(54) VARIABLE RATE RACK INSTALLATION

(71) Applicant: Amazon Technologies, Inc., Reno, NV (US)

(72) Inventors: Paul Andrew Churnock, Seattle, WA (US); Robert David Wilding, Seattle, WA (US); Faran Harold Kaplan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 428 days.

(21) Appl. No.: 14/561,169

(22) Filed: Dec. 4, 2014

(51) Int. Cl.
*G05D 3/12* (2006.01)
*G05B 13/02* (2006.01)

(52) U.S. Cl.
CPC .................................. *G05B 13/02* (2013.01)

(58) Field of Classification Search
CPC ...... G06F 1/3206; G06F 9/5094; G06F 17/50; G06F 1/266; G06F 11/261; G06F 1/28; G06F 17/5081; H05K 7/1498; H04L 41/12; H04L 41/5009; H04L 41/082; H04L 41/22; H04L 41/5025; H04L 12/10; H04L 41/0681; H04L 41/085; H04L 41/0896; H04L 41/147; H04L 41/5054
See application file for complete search history.

(56) References Cited

U.S. PATENT DOCUMENTS

| | | | | |
|---|---|---|---|---|
| 6,609,081 B1 * | 8/2003 | de Varennes | ........... | H04L 12/10 702/176 |
| 8,560,677 B2 * | 10/2013 | Vangilder | ............... | G06F 1/206 700/300 |
| 8,595,515 B1 * | 11/2013 | Weber | ................... | G06F 9/5094 713/300 |
| 8,645,722 B1 * | 2/2014 | Weber | ................... | G06F 9/5094 702/57 |
| 2008/0126022 A1 * | 5/2008 | Hoguet | ............... | G06F 17/5004 703/1 |
| 2009/0113323 A1 * | 4/2009 | Zhao | ...................... | G06Q 10/10 715/764 |

(Continued)

OTHER PUBLICATIONS

"Guidelines for Specification of Data Center Power Density", Neil Rasmussen, White Paper #120, 2005, pp. 1-21.

*Primary Examiner* — Darrin Dunn
(74) *Attorney, Agent, or Firm* — Robert C. Kowert; Meyertons, Hood, Kivlin, Kowert & Goetzel, P.C.

(57) ABSTRACT

A rack installation control system adjustably controls the rate at which rack computer systems are installed in computer rooms in one or more data centers, based on the electrical power consumption by the installed rack computer systems. The rack installation rate can be adjusted based on installed rack computer system power consumption exceeding a threshold, including a threshold proportion of a power supply capacity of a power distribution system. When the power consumption by installed rack computer systems in a particular computer room exceeds a threshold, rack computer system installation can be initiated in an additional room. Where a computer room includes a fixed number of positions, and when the fixed number of racks is installed in the computer room and at least some power distribution system power capacity is available, additional rack computer systems can be installed in an additional space to consume the available power distribution system capacity.

20 Claims, 13 Drawing Sheets

(56) References Cited

U.S. PATENT DOCUMENTS

| | | | |
|---|---|---|---|
| 2009/0235097 A1* | 9/2009 | Hamilton | G06F 1/3203 713/320 |
| 2009/0271725 A1* | 10/2009 | Dirla | H04L 41/12 715/771 |
| 2011/0077795 A1* | 3/2011 | Vangilder | G06F 1/206 700/300 |
| 2013/0006679 A1* | 1/2013 | Ruparelia | G06Q 10/00 705/7.11 |
| 2014/0052850 A1* | 2/2014 | Doorhy | H04L 43/0876 709/224 |
| 2015/0207755 A1* | 7/2015 | Tsai | H04L 47/76 709/226 |

\* cited by examiner

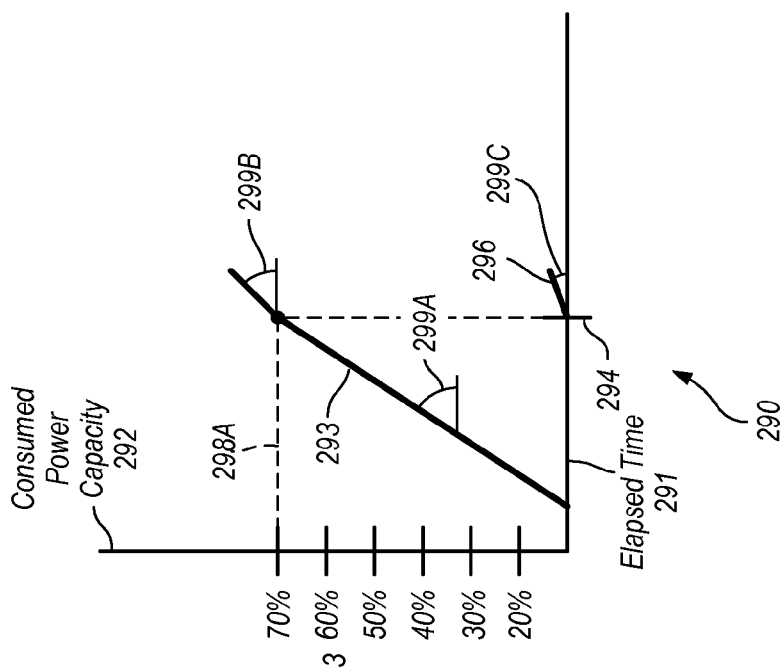
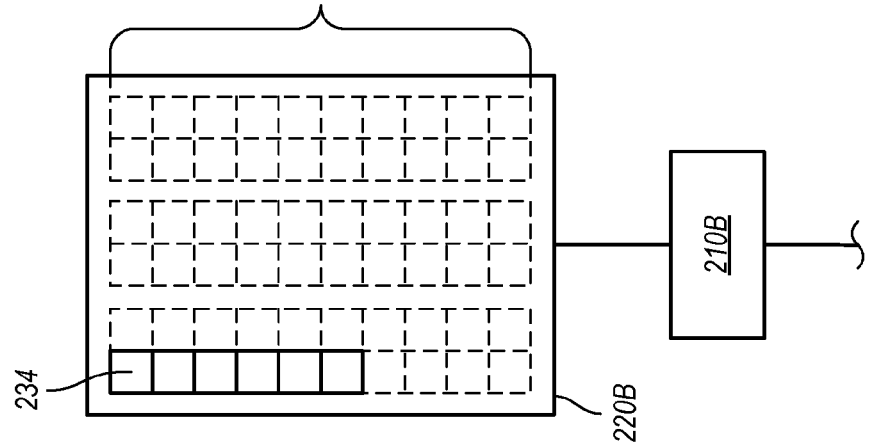
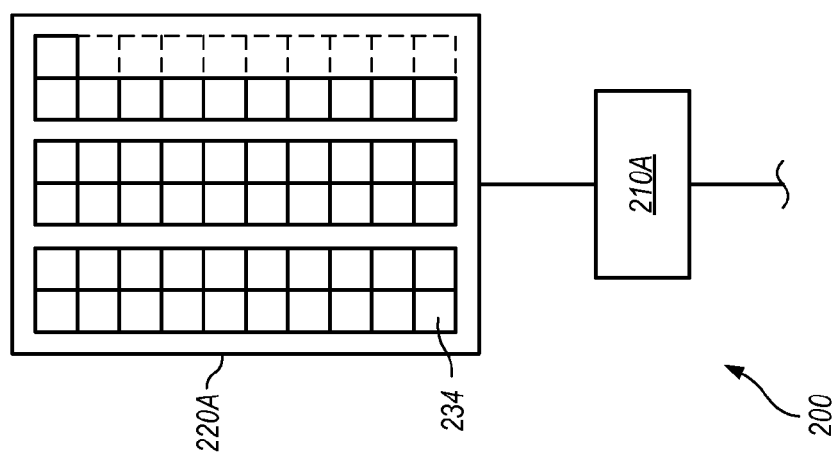
FIG. 2C
FIG. 2D

VARIABLE RATE RACK INSTALLATION

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Because a computing facility may contain a large number of servers, a large amount of infrastructure may be required to support computing capacity of the data center. In particular, a large amount of cabling infrastructure equipment, electrical distribution infrastructure equipment, network communication infrastructure equipment, air cooling infrastructure equipment, etc. may be required to support computing operations by servers in a data center at any given time. Some instances of infrastructure are usually installed at initial construction of a data center, based at least in part upon design assumptions regarding the support requirements of server racks (also referred to herein as "rack computer systems") that are expected to be installed in the data center.

In some cases, where some or all infrastructure initially installed in a data center is based on expected support requirements of server racks which are expected to be installed in the data center, the server racks which are actually installed in a data center may differ in support requirements from the server racks upon which the infrastructure for a data center is originally designed. In addition, the support requirements of installed server racks may vary from rack to rack. Infrastructure which is designed based on expected support requirements of installed server racks may be at least partially restricted in supporting server racks that are actually installed. In some cases, infrastructure which is designed based on expected support requirements of installed server racks may be at least partially undersubscribed in supporting server racks that are actually installed.

BRIEF DESCRIPTION OF THE DRAWINGS

FIGS. 2A-H illustrate variation of rack installation rates and sequential initiation of rack installation in data center computer rooms based on power consumption by installed racks, according to some embodiments.

Figure 1:
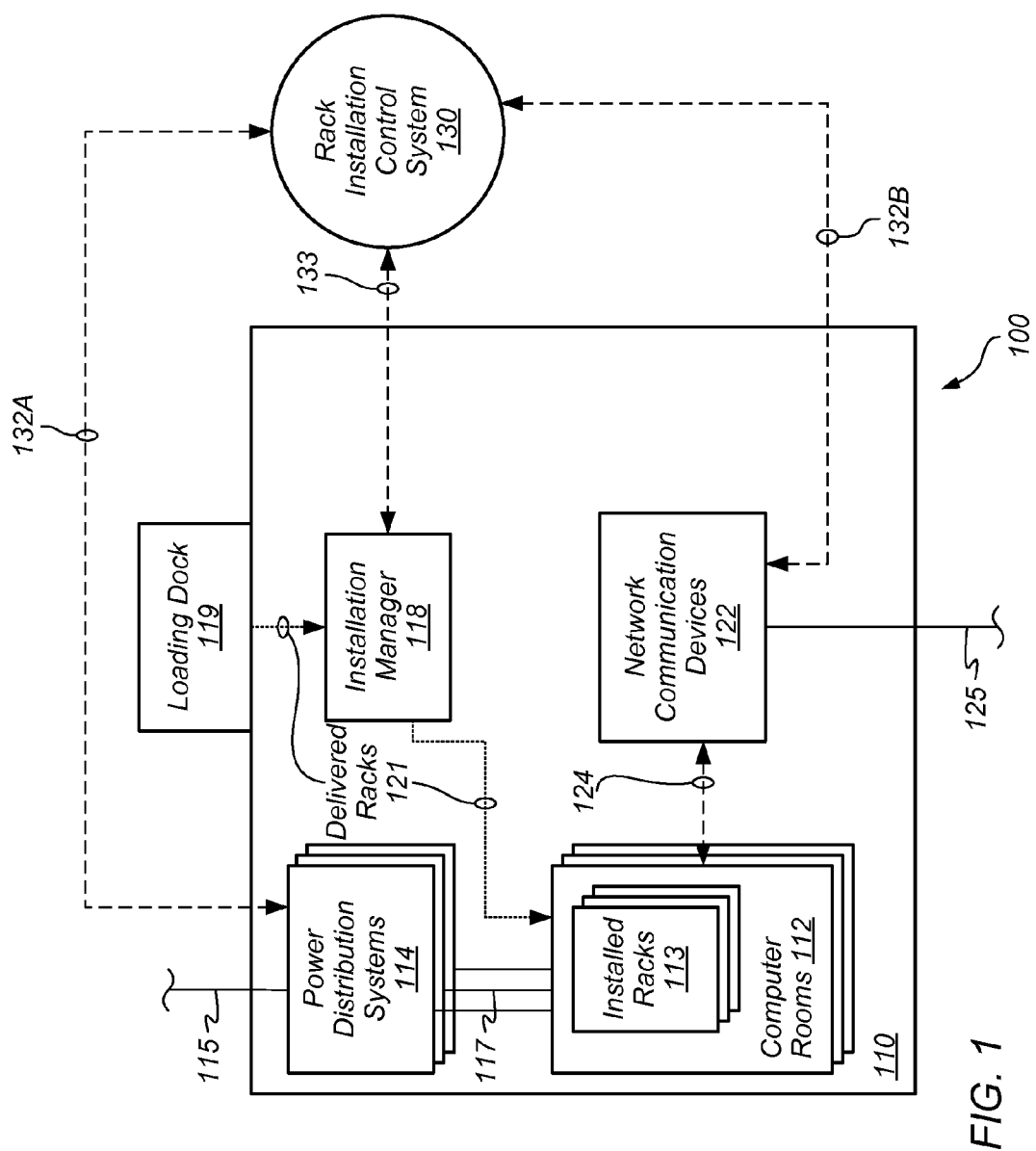
FIG. 1 is a schematic diagram illustrating a data center and a rack installation control system which manages installation of the rack computer systems in the data center, according to some embodiments.

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for installing rack computer systems, in various computer rooms of one or more data centers, at various controlled rack installation rates based on electrical power consumption by installed rack computer systems are disclosed.

According to one embodiment, a non-transitory, computer readable storage medium stores a program of instructions that, when executed by at least one computer system, cause the at least one computer system to adjustably control a rate at which rack computer systems are installed in each computer room in a data center, based at least in part upon electrical power consumed by the installed rack computer systems in each computer room. Such adjustable control can include monitoring, over a period of elapsed time, a rate at which rack computer systems are installed in the individual computer room, where the rate at which rack computer systems are installed in the individual computer room over the period of elapsed time is an initial rate, monitoring an increase, over the period of elapsed time, of electrical power consumption by the installed rack computer systems in the individual computer room, as a proportion of a power supply capacity of a particular power distribution system supplying the consumed electrical power, commanding a reduction of the rate at which rack computer systems are installed in the individual computer room, by a certain proportion of the initial rate, to a reduced rate, based at least in part upon a determination that the electrical power consumption, by the installed rack computer systems in the individual computer room, at least meets a particular threshold proportion of the power supply capacity of the particular power distribution system, and commanding an increase of a rate at which rack computer systems are installed in a different computer room, of the plurality of computer rooms, by the same certain proportion of the initial rate, such that the total rate at which rack computer systems are installed in the individual computer room and the different computer room is unchanged.

According to one embodiment, a method includes monitoring electrical power consumption by rack computer systems installed in a particular computer room, where rack computer systems are installed in the particular computer room at an initial rack installation rate, and adjusting the rack installation rate to a different rate, such that rack computer systems are installed in the particular computer room at the different rate, based at least in part upon a determination that the electrical power consumption by the installed rack computer systems in the particular computer room at least meets a particular threshold value.

According to one embodiment, an apparatus includes a computer system communicatively coupled to a power distribution system, wherein the power distribution system is configured to supply electrical power to installed rack computer systems in a particular computer room. The computer system is configured to monitor a rate at which rack computer systems are installed in the particular computer room, monitor electrical power consumption, of the electrical power supplied by the power distribution system, by the installed rack computer systems in the particular computer room, and command an adjustment of the rate at which rack computer systems are installed in the computer room, based at least in part upon a determination that the electrical power consumption by the installed rack computer systems in the particular computer room exceeds at least one threshold value.

As used herein, "computing" includes any operations that can be performed by a computer, such as computation, data storage, data retrieval, or communications.

As used herein, "computer room" means a room of a building in which computer systems, such as rack-mounted servers, are operated.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers and other systems and components dedicated to specific functions (e.g., e-commerce transactions, database management) or serving multiple functions. Examples of computer operations include information processing, communications, simulations, and operational control.

As used herein, "room", "hall", etc. means a room, space, enclosure, etc. of a structure. A "computer room" means a room in which computer systems, such as rack-mounted servers, are operated.

As used herein, a "space", "enclosure", etc. means a space, area or volume.

As used herein, a "module" is a component or a combination of components physically coupled to one another. A module may include functional elements and systems, such as computer systems, racks, blowers, ducts, power distribution units, fire suppression systems, and control systems, as well as structural elements, such a frame, housing, structure, container, etc. In some embodiments, a module is prefabricated at a location off-site from a data center.

In some embodiments, a rack installation control system controls the installation of rack computer systems in one or more computer rooms of a data center to provide computing capacity for the data center. Such control can include controlling the rate at which rack computer systems are installed in a computer room. As used herein, the rate at which rack computer systems are installed in a computer room is referred to as the "rack installation rate" for that computer room. As referred to herein, "rack computer systems" are referred to interchangeably as "racks".

In some embodiments, to control rack computer system installation, the rack installation control system can control one or more various devices which are configured to physically manipulate rack computer systems, mount rack computer systems in specified rack positions, coupled rack computer systems to one or more instances of infrastructure support, etc. In some embodiments, to control rack computer system installation, the rack installation control system can generate rack installation command signals which can be provided to one or more rack installation operators, where the command signals include commands to install racks in one or more particular rack positions, install racks in one or more particular computer rooms at one or more particular rack installation rates, some combination thereof, etc. As a result, the rack installation control system can generate rack installation command signals which cause racks to be installed in one or more particular rack positions, install racks in one or more particular computer rooms at one or more particular rack installation rates, some combination thereof, etc.

In some embodiments, the rack installation control system controls the rate at which racks are installed in a given computer room, also referred to herein as the rack installation rate for the given computer room, based on electrical power consumption by installed racks in the given computer room. For example, as electrical power consumption in a given computer room increases, the rack installation control system can reduce the rack installation rate for the given computer room. Such adjustment of rack installation rate can reduce the probability of the power consumption by installed racks in a computer room exceeding the electrical power support capacity of one or more power distribution systems configured to supply electrical power to installed racks in the given computer room.

For example, a data center can include multiple power distribution systems which are each configured to supply electrical power to installed racks in separate corresponding computer rooms. As a result, the power supply capacity of a given individual power distribution system can be the power supply capacity for the corresponding computer room. Furthermore, as racks are installed in a computer room, the electrical power consumption by a given installed rack can increase over time, as the amount of computing operations performed by a recently-installed rack can increase over time after the rack is initially installed, as the rack is gradually brought up to approximate full computing operation performance capacity. As a result, reducing the rack installation rate as the electrical power consumption approaches the power supply capacity, rather than installing racks at a particular installation rate until, following initially installing a particular rack, the electrical power consumption by the installed racks in a computer room reaches the power supply capacity for the room, reduces the probability that the electrical power consumption by installed and fully utilized racks in a computer room would exceed the power supply capacity for the computer room. Reducing the probability of such an occurrence, referred to herein as the power distribution system for the computer room becoming "oversubscribed", can result in optimized utilization of the installed racks, as a need to power off or "throttle back" computing operation performance by installed racks to stay within the power supply capacity for the room is mitigated by adjusting the rack installation rate as electrical power consumption by installed racks in a computer room approaches the power supply capacity for the room.

Adjusting the rack installation rate for a computer room based on electrical power consumption by installed racks in the computer room can include adjusting the rack installation rate based on the electrical power consumption by installed racks in a computer room at least meeting, exceeding, etc. one or more particular threshold values, also referred to herein as threshold amounts of electrical power consumption. The threshold values can include particular total amounts of electrical power consumption by the installed racks, including 2000 KVa, 3000 KVa, etc. In some embodiments, the threshold values can include particular proportions of the power supply capacity for the computer room. For example, where a power distribution system configured to supply electrical power to a computer room has a power supply capacity of 4500 KVa, the various threshold values can include electrical power consumption, by the installed racks in the computer room, which equals 70% of the power supply capacity, 80% of the power supply capacity, etc.

In some embodiments, the rack installation control system is configured to command particular adjustments to the rack installation rate for a computer room based on electrical power consumption by installed racks in the computer room at least meeting particular thresholds. For example, where racks are being installed in a computer room at a rack installation rate which equals the rate at which racks are delivered to a data center, also referred to herein as the rack delivery rate, the rack installation control system can adjust the rack installation rate for the computer room to 75% of the rack delivery rate when electrical power consumption by the installed racks in the room reaches 70% of the power supply capacity for the computer room, adjust the rack installation rate to 50% of the rack delivery rate when electrical power consumption by the installed racks in the room reaches 80% of the power supply capacity for the computer room, etc.

In some embodiments, the rack installation control system adjusts the rack installation rate for a given computer room based at least in part upon the rate at which electrical power consumption by installed racks in the computer room increases over a period of elapsed time. For example, where the rate at which electrical power consumption by installed racks in the computer room increases over time at least meets a certain threshold rate, the rack installation control system can command an adjustment of the rack installation rate to a rate which results in the electrical power consumption increase rate being less than another threshold rate. Such adjustment can preclude the rate at which electrical power consumption in a computer room increases from being too high, thereby reducing the risk that electrical power consumption by already-installed racks, initially less than the power supply capacity, increasing beyond the power capacity as the computing operation performance of the installed racks increases to approach full computing operation capacity.

In some embodiments, the rack installation control system controls adjustments to the rack installation rate for a given computer room based at least in part upon one or more of the amount of electrical power consumption by the installed racks and the rate at which electrical power consumption by installed racks in the computer room increases over a period of elapsed time As used herein, a power distribution system can be configured to supply electrical power to one or more downstream systems and components. A power distribution system can supply electrical power directly to an electrical load, including one or more racks, via one or more power transmission lines, indirectly via one or more instances of power distribution infrastructure, busways, tap boxes, patch cabling, intermediate components including automatic transfer switch (ATS) assemblies, etc.

A data center, in some embodiments, includes multiple power distribution systems which each supply electrical power, also referred to herein as provide electrical power support, to a separate set of computer rooms. Separate power distribution systems can be configured to supply electrical power to installed racks in separate computer rooms. Each power distribution system can include one or more sets of electrical power distribution components, including one or more utility transformers, backup power systems, generators switching devices, uninterruptible power supplies (UPSs), power distribution units (PDUs), electrical power transformers, etc. Each power distribution system can each be mounted in a separate assigned position in the data center as a separate unit, and a power feed inlet and outlet connections can be established, to install the respective modules in the data center. Each power distribution system can be connected, at an inlet end, to one or more various power feeds, including a common utility power feed, one of multiple separate power feeds, etc. Power distribution system can be connected, at an outlet end, to one or more various instances of power line infrastructure, including one or more power busways, etc.

A power distribution system can have a power supply "capacity", which can be referred to as the maximum amount of electrical power which the power distribution system is configured to supply. A portion of the power supply capacity of a power distribution system which is consumed by installed racks in a computer room can be referred to as "consumed" power supply capacity of the power distribution system, and a portion of the power supply capacity which is not presently consumed by installed racks, and is therefore available to be consumed by other installed racks, can be referred to as "available" power supply capacity of the power distribution system.

In some embodiments, a given computer room in a data center has a particular set of rack positions in which racks can be installed, such that the computer room is configured to accommodate a particular number of installed racks. In some embodiments, a power distribution system which is configured to supply electrical power to a given computer room, also referred to as being configured to supply electrical power to installed racks in the given computer room, is configured to have a particular power supply capacity which corresponds to an estimated total electrical power consumption by the particular number of installed racks in a computer room when each rack position in the computer room is occupied by an installed rack.

For example, where a computer room initially includes 300 unoccupied rack positions, a power distribution system can be installed and configured to supply electrical power to the computer room, prior to installation of racks in the computer room. The power distribution system can be configured to supply 3000 KVa of electrical power, based on estimated total electrical power consumption by installed racks in the computer room where the electrical power consumption by each individual installed rack is estimated to be 10 KVa per installed rack. As a result, where all of the subsequently-installed racks in the computer room do, in fact, consume 10 KVa of electrical power, the power distribution system can be referred to as "fully subscribed", as the electrical power consumption by the installed racks in the computer room matches the power supply capacity of the power distribution system and no available capacity is left when all rack positions are occupied by installed racks in the computer room.

In some embodiments, to control rack installation in one or more computer rooms in one or more data centers, the rack installation control system is configured to adjust a rack installation rate for a computer room based on electrical power consumption by racks in another separate computer room. Such adjustment can be based on adjustments to rack installation rates in the other separate computer room, and can be equal and opposite to the rack installation rates in the other separate computer room. For example, where rack installation rates in two computer rooms in a data center is at 50% of the rack delivery rate for the data center, and the electrical power consumption by the installed racks in one computer room passes a threshold of 90% of the power supply capacity for that room, the rack installation rate for that computer room can be reduced to 25% of the rack delivery rate, while the rack installation rate for the other computer room can be concurrently increased to 75% of the rack delivery rate. As a result, the total rack installation rate for multiple computer rooms, including the total rack installation rate for the data center, can correspond to the rack delivery rate, despite variations of rack installation rates in individual computer rooms, so that delivered racks continue to be installed in the data center at a maximum rate, thus reducing waste caused by delivered but uninstalled racks in a data center.

In some embodiments, to adjust a rack installation rate for a computer room based on electrical power consumption by racks in another separate computer room adjusting a rack installation rate for a computer room, the rack installation control system is configured to command the initiation of rack installation in a given computer room based on electrical power consumption by installed racks in another computer room. Such initiation of rack installation in the given computer room can be commanded while available power supply capacity for the other computer room remains, so that racks are concurrently installed in both computer rooms for at least a limited period of elapsed time.

In some embodiments, after electrical power consumption by installed racks in a particular computer room reaches a first threshold, the rack installation control system reduces the rack installation rate for the particular computer room and initiates rack installation, in a separate computer room, at the rack installation rate at which the rate for the particular computer room is reduced. As the electrical power consumption by installed racks in the particular computer room progressively reaches additional thresholds and approaches the power supply capacity for the particular computer room, the rack installation rate for the particular computer room can be progressively reduced by the rack installation control system, while the rack installation rate for the separate computer room is progressively increased by the rack installation control system. Once the electrical power consumption by installed racks in the particular computer room reaches a threshold amount of power consumption which is within a certain predetermined difference from the power supply capacity for the computer room, also referred to herein as the final threshold, rack installation in the particular computer room can be discontinued by the rack installation control system and the rack installation rate for the separate computer room can be increased, by the rack installation control system, to match the rack delivery rate for the data center.

In some embodiments, the actual electrical power consumption by individual installed racks in a computer room is more or less than the estimated consumption upon which the power supply capacity of the power distribution system for the computer room is based. Where the actual electrical power consumption by the racks is less than the estimated consumption, the power supply capacity of the power distribution system may be under-utilized by the computer room even where all rack positions in the computer room are occupied. Such an occurrence can be referred to herein as the power distribution system being undersubscribed. Where the actual electrical power consumption by the racks is more than the estimated consumption, the number of racks which can be installed in the computer room without exceeding the power supply capacity of the power distribution system may be less than the number of rack positions in the computer room. Such an occurrence can result in under-utilization of the space encompassed by the computer room.

In some embodiments, where a computer room has a particular number of rack positions, the power distribution system configured to supply electrical power to the computer room can have available power supply capacity after all rack positions in the computer room are occupied, such that the number of installed racks in the computer room is the particular number and the power distribution system is undersubscribed.

In some embodiments, a data center includes multiple expansion areas, where each individual expansion area is associated with a separate particular computer room and is configured to accommodate a set of additional racks after all of the rack positions in the computer room are occupied by installed racks. An expansion area can be configured to receive electrical power from the same power distribution system which supplies electrical power to the particular computer room. As a result, installing additional racks in the expansion area can result in additional consumption by electrical power supplied by an otherwise undersubscribed power distribution system, thereby resulting in optimization of the power distribution system.

A given expansion area which is configured to accommodate one or more additional racks after all of the rack positions in a particular computer room are occupied by installed racks can be referred to as a corresponding expansion area, relative to the particular computer room, and the particular computer room can be referred to as a corresponding computer room relative to the expansion area. In addition, the computer room and expansion area can be referred to as a corresponding computer room and a corresponding expansion area, respectively, relative to the common power distribution system from which both the computer room and expansion area are configured to receive electrical power, and the power distribution system can be referred to as a corresponding power distribution system relative to the computer room and the expansion area.

In some embodiments, where a power distribution system power supply capacity is fully utilized, which as referred to herein refers to a sufficient amount of the power supply capacity being consumed that the remaining available power supply capacity is determined to be less than an estimated amount required to support electrical power consumption by at least one additional rack, an additional power distribution system can be installed in an unoccupied but otherwise reserved portion of the data center, where the additional power distribution system is configured to supply electrical power to racks installed in one or more expansion areas. As a result, the available space in a data center can be fully utilized.

In some embodiments, a data center includes an interior enclosure, and each computer room is a particular limited area within the interior enclosure. Computer rooms may, in some embodiments, be exposed to each other along adjacent computer room boundaries. In some embodiments, a computer room and a corresponding expansion area, determined based on the expansion area being configured to receive electrical power, for additional racks installed therein, supplied by the same power distribution system which supplies electrical power to racks in the computer room, are located proximate to each other. For example each expansion area in a data center can be located proximately to a corresponding computer room of the respective expansion area. In some embodiments, an expansion area is located remotely from a corresponding computer room. In some embodiments, multiple expansion areas are located proximately to each other and remotely from one or more corresponding computer rooms of one or more of the expansion areas.

FIG. 1 is a schematic diagram illustrating a data center and a rack installation control system which manages installation of the rack computer systems in the data center, according to some embodiments.

System 100 includes a data center 110 and a rack installation control system 130 which is configured to control rack installation in the data center 110. Data center 110 includes a set of one or more computer rooms 112 which are configured to accommodate a set of one or more installed racks 113. To be configured to accommodate installed racks, a computer room can include a set of rack spaces, which can include spaces configured to accommodate at least some of a footprint of a rack, instance of power line infrastructure, including busways, power cabling, patch cabling transfer switch devices, power distribution units, network switch devices, console switch devices, some combination thereof, etc.

Data center 110 includes one or more power distribution systems 114. Each power distribution system 114 can receive power from one or more power feeds 115 and is configured to supply electrical power to one or more computer rooms 112. In some embodiments, each power distribution system 114 is configured to supply electrical power to a separate individual computer room. Such a computer room can be referred to as being a corresponding computer room, relative to the power distribution system, and the power distribution system can be referred to as being a corresponding power distribution system, relative to the computer room. Racks 113 installed in a given computer room 112 can consume electrical power supplied to the room 112 by a corresponding power distribution system 114.

Data center 110 includes a set of network communication devices 122, which can include one or more network switches, routers, main distribution frames, some combination thereof, etc. One or more of the network communication devices 122 can be communicatively coupled to each of the installed racks 113 in the data center 110 via one or more instances of network communication infrastructure 124. The network communication devices 122 can each be communicatively coupled to one or more communication networks 125, thereby communicatively coupling the installed racks 113 to the one or more communication networks.

In some embodiments, racks 113 are installed gradually in a data center 110 over time, so that racks 113 are gradually installed in various computer rooms 112 over time. Data center 110 includes a loading dock 119 where racks 121 can be delivered from an external supplier. Such a supplier can include a vendor of racks, a manufacturer of racks, an inventory storage site, etc. Where racks 121 are delivered to data center 110 from an inventory storage site, the site can be managed by a third-party, relative to the party managing the data center 110, a vendor of the racks, a manufacturer of the racks, etc. When racks 121 are delivered to the data center 110, the delivered racks 121 can be installed in particular computer rooms 112 of the data center 110 by an installation manager 118. The installation manager 118 can include a control system which determines which computer room 112 to install a given delivered rack 121, which rack positions in the room 112 to install the rack 121, etc. In some embodiments, an installation manager directly controls installation of racks in one or more computer rooms via control of one or more devices which can manipulate and move racks 121 through one or more portions of the data center 110, mount one or more racks in one or more computer rooms 112, couple one or more racks with one or more instances of support infrastructure, etc. In some embodiments, manager 118 includes an operator interface which provides commands to one or more operators to install one or more racks in one or more computer rooms 112, and as a result can cause the one or more operators to install one or more racks in one or more computer rooms 112 based on the commands.

In some embodiments, a rack installation control system 130 controls the rate at which racks are installed by the installation manager 118 in one or more computer rooms 112. Such control can include controlling whether rack installation in one or more particular computer rooms 112 is initiated or terminated by manager 118. Such control can include commanding the manager 118 to install racks in one or more particular computer rooms at one or more particular rates. Such a rate at which racks are commanded to be installed in a computer room, also referred to herein as a rack installation rate for the computer room, can be a particular quantity of racks within a particular period of elapsed time.

In some embodiments, the rack installation rate for a given computer room is a determined proportion of a rate at which racks are delivered to the data center 110, where such a rate is referred to herein as the rack delivery rate for the data center 110. For example, where racks 121 are received at loading dock 119 at a rate of 12 racks per week, system 130 can command the installation of the racks in one selected computer room 112 at a rate which is 75% of the rack delivery rate, or approximately 9 racks per week, and can command the installation of the racks in another selected computer room 112 at a rate which is 25% of the rack delivery rate, or approximately 3 racks per week. System 130 can communicate with manager 118 via one or more communication links 133.

In some embodiments, the rack installation control system 130 adjustably controls the rack installation rate for various computer rooms in a data center based on monitored electrical power consumption by installed racks in the various computer rooms. The rack installation system 130 can reduce the rack installation rate for a particular computer room 112 based at least in part upon the system 130 determining that the electrical power consumption by installed racks 113 in the room 112 approaches, meets, exceeds, etc. one or more various threshold values, for example.

The rack installation system 130, in some embodiments, can adjust rack installation rates for multiple computer rooms 112 based on electrical power consumption by installed racks 113 in a particular computer room 112. For example, where the system 130 reduces a rack installation rate for one computer room 112 by a certain amount of racks over a period of time, based on the system 130 determining that electrical power consumption by installed racks 113 in that computer room 112 at least meets a particular threshold value, the system 130 can increase the rack installation rate for another computer room 112 by the same amount of racks over the period of time.

In some embodiments, the system 130 can increase the rack installation rate for multiple computer rooms concurrently with reducing a rack installation rate for another computer room; for example, increasing the rack installation rate for two computer rooms by 5 racks per week concurrently with reducing the rack installation rate for another computer room by 10 racks per week. As a result, the total rack installation rate for a set of computer rooms 112 in a data center 110 can remain at a fixed proportion of the rack delivery rate, including 100%, while the distribution of delivered racks 121 to be installed in various computer rooms 112 can change over time based on monitored electrical power consumption by installed racks 113 in the various computer rooms 112.

In some embodiments, the rack installation control system 130 determines whether electrical power consumption by installed racks 113 in a computer room 112 meets one or more thresholds based on monitoring power supply capacities of each of one or more power distribution systems, monitoring installation of racks in one or more computer rooms, and monitoring electrical power consumption by installed racks in the one or more computer rooms.

Monitoring power supply capacities of each of one or more power distribution systems can include interacting with one or more portions of a power distribution system 114, via one or more communication links 132A between system 130 and the system 114, to access power capacity information from at least some portion of the power distribution system 114. Such interaction can include accessing power capacity information from one or more power distribution components included in the power distribution system, including one or more UPSs, switchboards, switchgear, transfer switches, transformers, electrical power sensors, some combination thereof, etc. For example, system 130 can, in some embodiments, communicate with a UPS included in a given power distribution system 114 via a communication link 132A and, based on the communication, determine a power supply capacity of the given power distribution system 114.

Monitoring rack installation in one or more computer rooms of a data center can include communicating with an installation manager 118 to access installation information, stored at the manager 118, which can indicate installation of racks in one or more particular rack positions in one or more computer rooms. In some embodiments, system 130 can communicate with one or more installed racks 113, via one or more communication links 132B, via one or more network communication devices 122, to determine that particular racks 113 are installed in particular computer rooms 112 in the data center 110.

Monitoring electrical power consumption by installed racks in one or more computer rooms, in some embodiments, includes monitoring, at the rack installation control system 130, power data generated by one or more power sensors associated with one or more of said installed racks, the power distribution system supplying electrical power to said installed racks in the computer room, some combination thereof, etc. For example, system 130 can, in some embodiments, determine electrical power consumption by electrical power supplied to a computer room by a particular power distribution system 114 based on communication, via one or more communication links 132A, with one or more power sensors electrically coupled to one or more output power transmission lines 117 of the power distribution sensor. Power sensors can include any known power sensor, including one or more current sensors, voltage sensors, etc. Power data can include current data, voltage data, etc. which system 130 processes to determine electrical power consumption. In some embodiments, communication over one or more links 132A includes power data, including one or more electrical signals, being transmitted from one or more power sensors to one or more components of system 130.

In some embodiments, the rack installation control system 130 determines the rack delivery rate based on communication with at least a portion of the installation manager 118, one or more external services, systems, etc. For example, system 130 can determine a rack delivery rate based on data, received from manager 118, indicating deliveries of racks at the data center 110 over one or more periods of time. Such data can be generated at manager 118 based at least in part upon one or more of manual operator input via a user interface, processing rack delivery information from one or more suppliers, couriers, etc. System 130 can receive rack delivery data associated with each delivery of one or more racks at data center 110 over one or more periods of time. System 130 can track the rate at which racks are delivered to data center 110 based at least in part on the data. In some embodiments, system 130 is communicatively coupled to one or more rack suppliers via one or more communication networks and can determine a rack delivery rate for the data center 110 based at least in part upon rack delivery information received from one or more rack suppliers.

FIGS. 2A-H illustrate variation of rack installation rates and sequential initiation of rack installation in data center computer rooms based on power consumption by installed racks, according to some embodiments.

In some embodiments, a rack installation control system adjusts a rack installation rate for one or more computer rooms, based on variations in electrical power consumption by installed racks in the one or more computer rooms. Such adjustment can include reducing the rate at which racks are installed in a given computer room—also referred to herein as the rack installation rate for the given computer room—based on determining that electrical power consumption by the installed racks in the given computer room at least meeting one or more various threshold values. In some embodiments, electrical power consumption is monitored as a proportion of the power supply capacity of the power distribution system which supplies electrical power to the computer room, the power supply capacity for the computer room, etc.

Figures 2A, 2B:
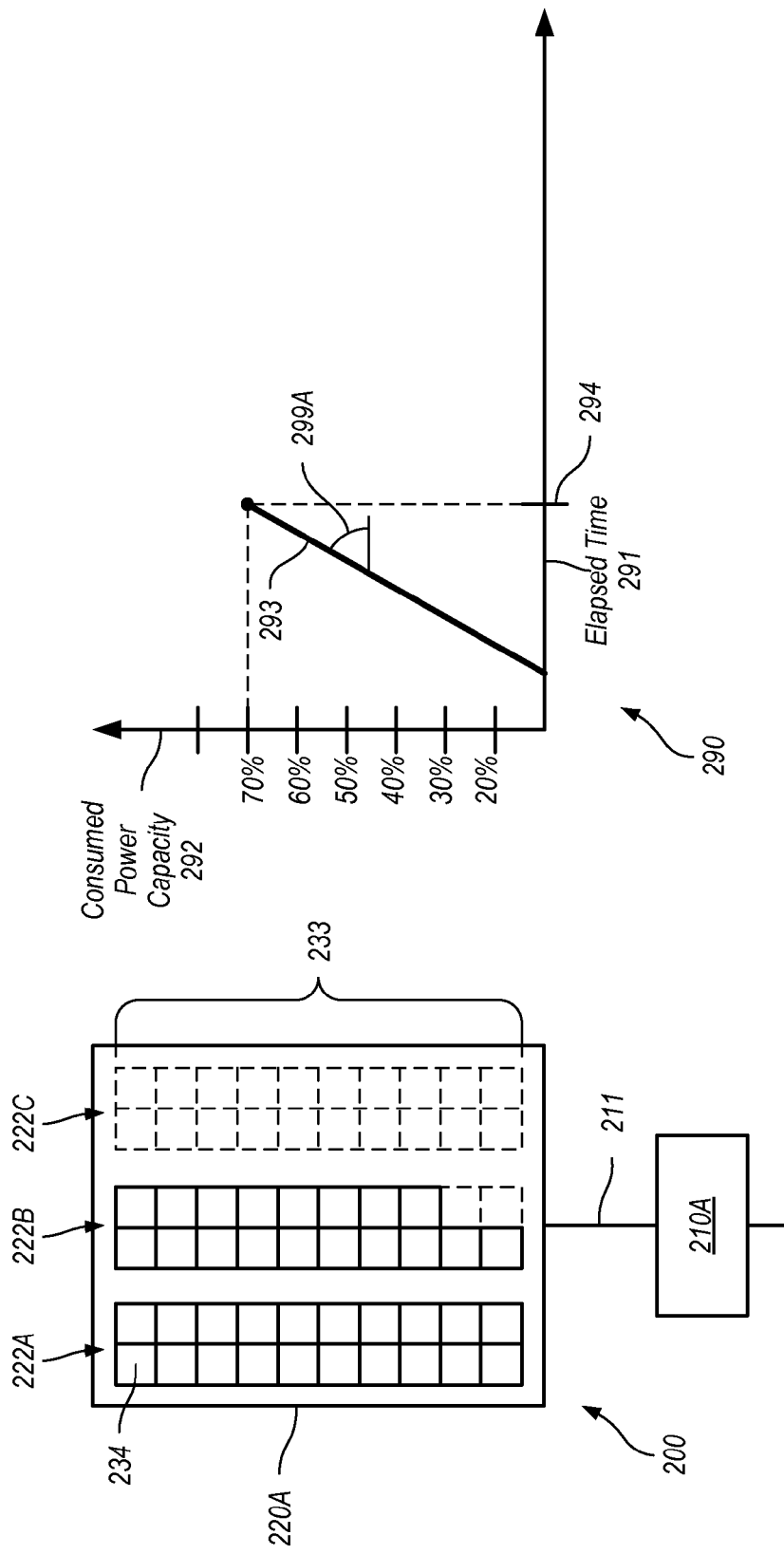

FIG. 2A illustrates a schematic diagram of a system 200 which includes a computer room 220A which comprises multiple sets 222A-C of rack positions 233 in which racks 234 can be installed and a power distribution system which is configured to supply electrical power to installed racks in the computer room, according to some embodiments. FIG. 2B illustrates a graphical representation of electrical power consumption by installed racks 234 in the computer room 220A, as a proportion of the power supply capacity of the power distribution system 210A over a period of elapsed time.

Power distribution system 210A is configured to receive power from a power feed 213 and supply electrical power to installed racks in the computer room 220A via one or more instances of power line infrastructure 211. As shown in FIG. 2B, the graphical representation 290 represents a variation in electrical power consumption 293 by installed racks 234 in room 220A as a proportion 292 of the power supply capacity of system 210A against elapsed time 291. For example, at elapsed time 294, the electrical power consumption 293 of the installed racks 234 equals 70% of the power supply capacity of the power distribution system 210A, which can also be referred to interchangeably as 70% of the power supply capacity for the computer room 220A. When power consumption 293 equals 100% of the power supply capacity, the power distribution system 210A is fully utilized, also referred to herein as the power distribution system 210A being fully subscribed, and no available power supply capacity remains to provide electrical power support to any components.

In some embodiments, a computer room initially does not include any installed racks, and racks are gradually installed in rack positions in the computer room over time at a rate, known as the rack installation rate for the computer room, which can be established by a rack installation control system. As a result of installing racks in the computer room over time, the electrical power consumption by the installed racks in the computer room increases over time. FIG. 2A illustrates a view of a computer room 220A which was initially free of racks, such that all of the rack positions 233 were initially unoccupied, and racks 234 have been gradually installed in available rack positions 233 over time at one or more rack installation rates, as commanded by a rack installation control system. As a result, as shown in FIG. 2B, the electrical power consumption 293 of installed racks in the room 220A has increased over time at one or more rates 299A. The rate 299A at which electrical power consumption 293 increases over time can correspond to the rack installation rate for the room 220A. For example, rate 299A can be proportional to the rack installation rate for room 220A. Such a rate 299A can fluctuate, based at least in part upon one or more of fluctuating rack delivery rates for a data center in which room 220A is located, variations in electrical power consumption by various installed racks 234, etc. For example, some installed racks 234 can consume 10 KVa of electrical power when fully utilized, some racks 234 can consumer 15 KVa, and some racks can consumer 5 KVa, etc. A rack installation control system can monitor the electrical power consumption 293 by the installed racks 234 in room 220A based on power supply capacity 292 and elapsed time 294.

In some embodiments, a rack installation control system which monitors electrical power consumption by installed racks in one or more computer rooms can adjust the rack installation rate for one or more computer rooms, based at least in part upon the electrical power consumption by installed racks in a computer room at least meeting one or more particular threshold values. For example, in the illustrated embodiment, consumption, by the installed racks 234 in room 220A, of 70% of the power supply capacity of system 210A can be a threshold value 298A, where the rack installation control system responds by adjusting the rack installation rate for room 220A, such that racks 234 are subsequently installed in room 220B at the adjusted rate. The adjusted rate can be reduced, relative to the initial rate at which racks were installed in the room 220A prior to time 294.

FIG. 2C illustrates a schematic diagram of system 200 which includes computer rooms 220A-B, where racks 234 are installed concurrently in both rooms 220A-B subsequent to electrical power consumption in room 220A reaching a particular threshold value. Specifically, rack installation is initiated in room 220B, where racks 234 installed in the rack positions 233 of room 220B consume electrical power supplied by power distribution system 210B, which is separate from power distribution system 210A. As a result, racks 234 installed in room 220B consume power capacity of system 210B, while racks 234 installed in room 220A consume power capacity of system 210A. Power distribution systems 210A, 210B can supply electrical power received from different power feeds, common power feeds, some combination thereof, etc. In addition, as shown, in FIG. 2D, the rack installation rate for room 220A is adjusted by a rack installation control system to a reduced rate which corresponds to a reduced rate 299B at which electrical power consumption 293 by installed racks in room 220A increases, relative to the initial rate 299A.

As shown in FIG. 2C-D, racks 234 are initially installed in room 220A at a particular rack installation until a time 294 at which the electrical power consumption 293 by the installed racks in room 220A reaches a threshold value 298A of 70% of the power supply capacity of power distribution system 210A. As a result of the consumption 293 reaching the threshold, a rack installation control system, at time 294, responds by adjusting the rack installation rate for room 220A, reducing the rate by a certain amount, and initiates rack installation in a next computer room 220B, setting the rack installation rate for the next room 220B at an amount which equals the amount by which the rack installation rate for room 220A is adjusted at time 294. As a result, the total rack installation rate for both rooms 220A-B is equal both prior to and immediately subsequent to time 294, although the individual rack installation rates for each room 220A-B is adjusted.

The values of the threshold values, and the amounts by which the rack installation rates are adjusted when consumption by installed racks in a given room reaches a particular threshold, can vary. Such thresholds and adjustment amounts can be determined by the rack installation control system. In some embodiments, the threshold values can include 70%, 80%, 85%, and 90% of power supply capacity of the corresponding power distribution system for the computer room, and the rack installation rate adjustments when consumption reaches each threshold can include a 25% reduction in the rack installation rate for the given computer room and a 25% increase in the rack installation rate for another computer room. As shown in FIG. 2D, for example, the consumption rate 299A can correspond to a rack installation rate for room 220A, prior to time 294, which is 100% of the rack delivery rate for the data center in which room 220A is located, while the consumption rate 299B can correspond to a rack installation rate for room 220A, subsequent to time 294, which is 75% of the rack delivery rate, as a result of the rack installation control system reducing the rack installation rate for room 220A by 25% upon the consumption 293 reaching a threshold value 298A of 70% of the power supply capacity of system 210A. Similarly, the electrical power consumption 296 of installed racks in room 220B, initiated by the rack installation control system at time 294 based at least in part upon the consumption 293 by installed racks in room 220A reaching a threshold value of 70% of the power supply capacity of system 210A, can have a consumption rate 299C which corresponds to a rack installation rate for 220B which is 25% of the rack delivery rate, thereby representing the difference of the adjustment of the rack installation rate for room 220A by the rack installation control system at time 294.

In some embodiments, rack installation rates for various computer rooms can be adjusted, by the rack installation control system, over time such that the rack installation rate for one room is gradually decreased, and can increased in one or more other computer rooms, as the electrical power consumption by installed racks in the computer room approaches 100% of the power supply capacity for the computer room. In some embodiments, an adjustment to a rack installation rate for one computer room is inversely proportional to an adjustment to a rack installation rate for another computer room. In some embodiments, an adjustment to a rack installation rate for one computer room is equal and opposite in magnitude, relative to an adjustment to a rack installation rate for another computer room. For example, as shown in FIG. 2D, the increase in the rack installation rate for room 220B, with the corresponding increase in the rate 299C of increase of electrical power consumption 296 by installed racks in room 220B, is equal and opposite in magnitude to the decrease to the rack installation rate for room 220A at time 294.

Figure 2F:
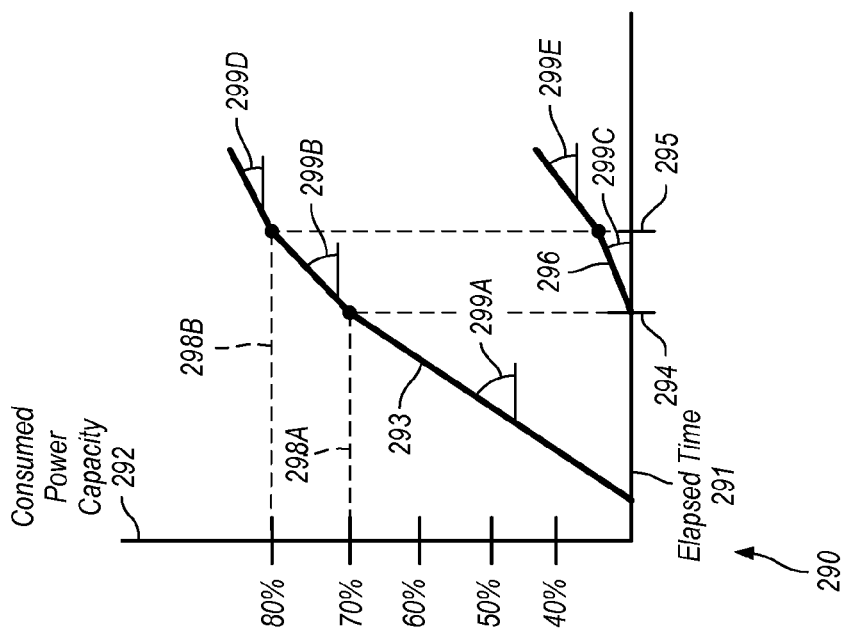
Figure 2E:
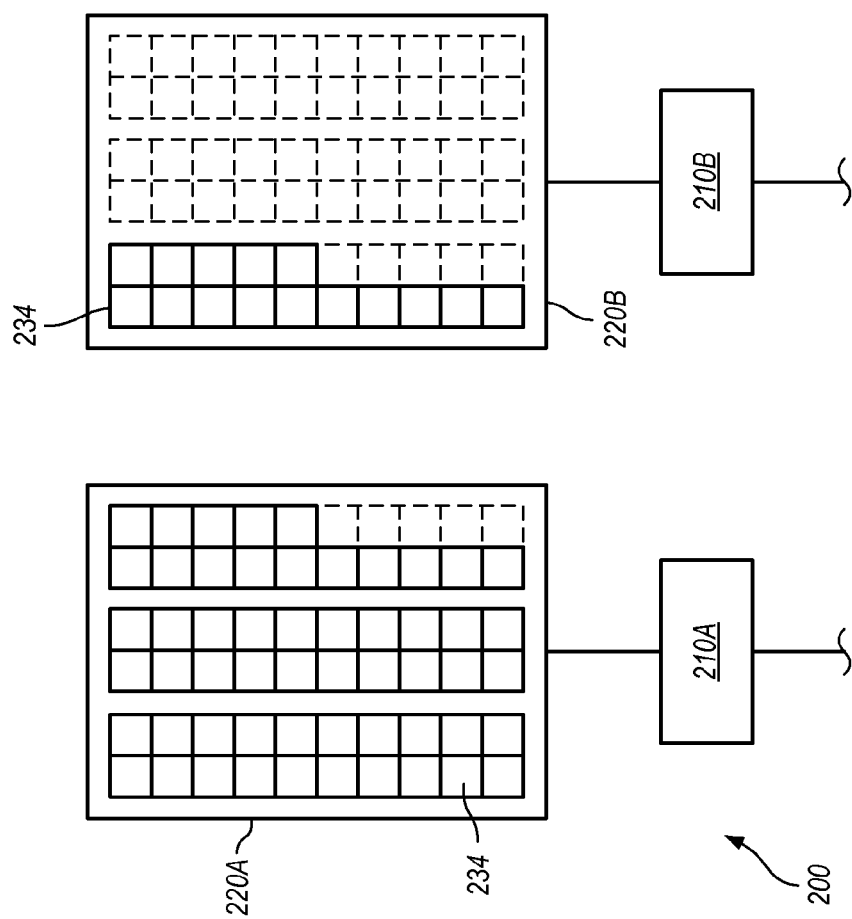

FIG. 2E-F illustrate a rack installation control system adjusting the rack installation rates for both computer room 220A-B based at least in part upon the electrical power consumption by installed racks 234 in room 220B reaching additional thresholds, subsequent to reaching a first threshold 298A. As shown in FIG. 2E, additional racks are installed in both rooms 220A-B subsequent to time 294. As shown in FIG. 2E relative to FIG. 2C, racks 234 are installed at a greater rate for room 220A than in room 220B. FIG. 2E illustrates the installed racks 234 in rooms 220A-B at time 295, as shown in FIG. 2F As shown in FIG. 2E-F, racks 234 are installed in room 220A at a particular rack installation rate corresponding to the electrical power consumption variation rate 299B, after time 294 and prior to time 295, at which time the electrical power consumption 293 by the installed racks in room 220A reaches a threshold value 298B of 80% of the power supply capacity of power distribution system 210A. As a result of the consumption 293 reaching the threshold, a rack instal-
lation control system, at time 295, responds by adjusting the rack installation rate for room 220A, reducing the rate by a certain amount, and concurrently adjusts the rack installation rate for the next computer room 220B, setting the rack installation rate for the next room 220B at an amount which equals the amount by which the rack installation rate for room 220A is adjusted at time 295. As a result, the total rack installation rate for both rooms 220A-B is equal both prior to and immediately subsequent to time 295, although the individual rack installation rates for each room 220A-B is adjusted.

As shown in FIG. 2F, the consumption rate 299B can correspond to a rack installation rate for room 220A, prior to time 295, which is 75% of the rack delivery rate for the data center in which room 220A is located, while the consumption rate 299D can correspond to a rack installation rate for room 220A, subsequent to time 294, which is 50% of the rack delivery rate, as a result of the rack installation control system reducing the rack installation rate for room 220A by 25% upon the consumption 293 reaching a threshold value 298B of 80% of the power supply capacity of system 210A. Similarly, the electrical power consumption 296 of installed racks in room 220B, increasing, after time 294, at a rate 299C which corresponds to a rack installation rate which is 25% of the rack delivery rate, can be adjusted, based at least in part upon the consumption 293 by installed racks in room 220A reaching a threshold value 298B of 80% of the power supply capacity of system 210A, to a rack installation rate which corresponds to a consumption rate 299E. The rack installation rate for room 220B after time 295 can be 25% of the rack delivery rate, thereby representing the difference of the adjustment of the rack installation rate for room 220A by the rack installation control system at time 295.

In some embodiments, rack installation can be terminated based at least in part upon electrical power consumption by installed racks in a computer room at least meeting a final threshold value, where the final threshold value can be associated with a determination that the remaining available power supply capacity of the power distribution system configured to supply electrical power to the computer room is insufficient to support computing operations by an additionally-installed rack in the computer room. Based at least in part upon determining that electrical power consumption by installed racks in a computer room has reached the final threshold value, a rack installation control system can command termination of rack installation in the computer room and concurrently increase the rack installation rates for one or more other computer rooms so that the instantaneous total rack installation rate across multiple computer rooms is unchanged.

Figure 2H:
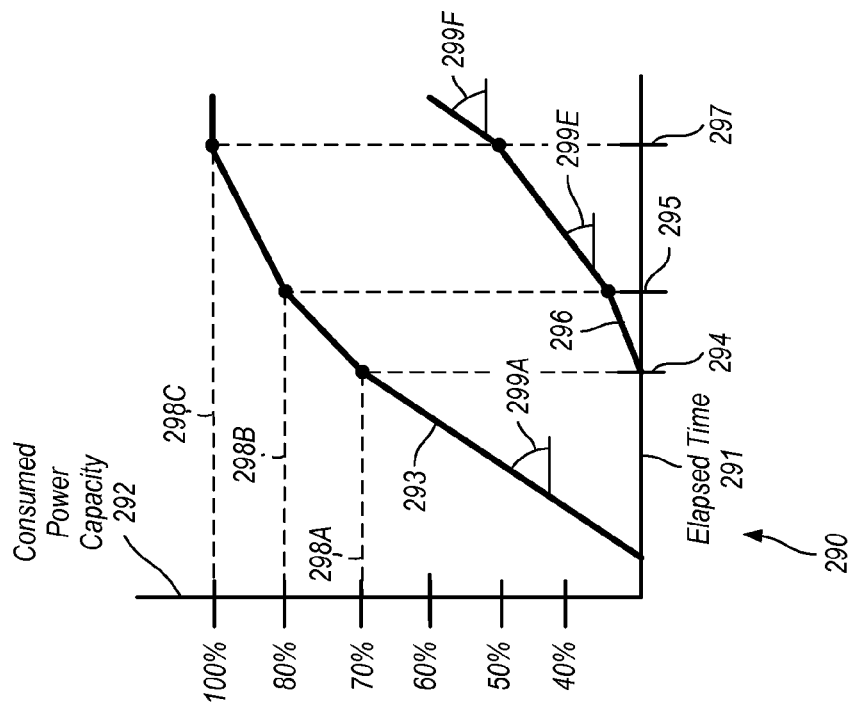
Figure 2G:
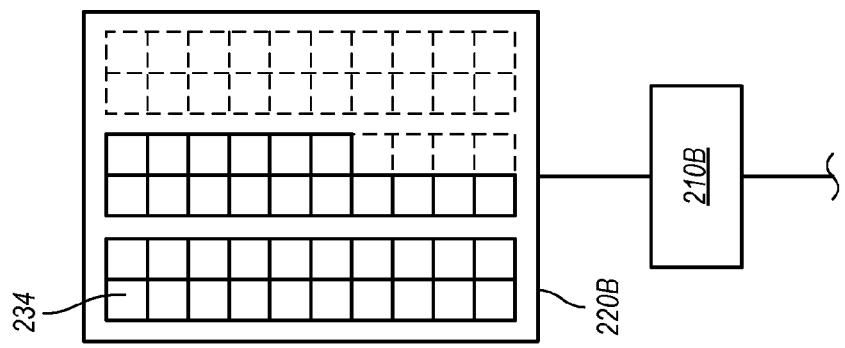
Figure 2G:
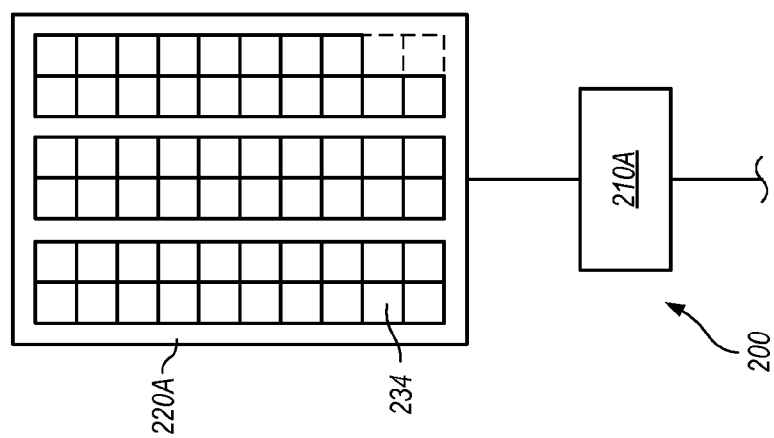

FIG. 2G-H illustrate a rack installation control system terminating rack installation in room 220A and transferring rack installation completely over to room 220B, based at least in part upon a determination that, at time 297, the electrical power consumption 293 by installed racks 234 in the room 220A has reached a final threshold value 298C of 100% of the power supply capacity of power distribution system 210A. While, as shown in FIG. 2G, additional unoccupied rack positions 234 may remain in room 210A, the rack installation control system can determine to terminate rack installation in room 220A to prevent from installing too many racks 234 in the room 220A, such that the power supply requirements of the installed racks exceed the power supply capacity of the power distribution system 210A. As a result, the need to reduce computing operation performance by installed racks 234 in room 220A, take installed racks offline, etc. to reduce electrical power consumption by the racks in room 220A can be mitigated, as the installed racks 234 fully utilize the power supply capacity of the power distribution system 210A. Such a result can further minimize wastage of the power supply capacity of the power distribution system 210A, thereby resulting in an efficient utilization of electrical power distribution resources.

As shown in FIG. 2H, at time 297, where the electrical power consumption 293 by the installed racks in room 220A reaches the final threshold value 298C, the rack installation control system commands a termination of rack installation in room 220A, thereby resulting in power consumption 293 remaining approximately fixed after time 297. In addition, the rack installation rate for room 220B is increased, at time 297, to match the reduction in rack installation rate for room 210A resulting from the termination of rack installation in room 220A. Thus, the rack installation rate for room 220B, after time 297, can match the rack delivery rate for system 200. As a result, the rack installation rate for room 220B, and thus the corresponding rate 299F of increase of electrical power consumption by the installed racks in room 220B after time 297 can match the rate 299A of increase of electrical power consumption by the installed racks in room 220A prior to time 294.

Figure 3:
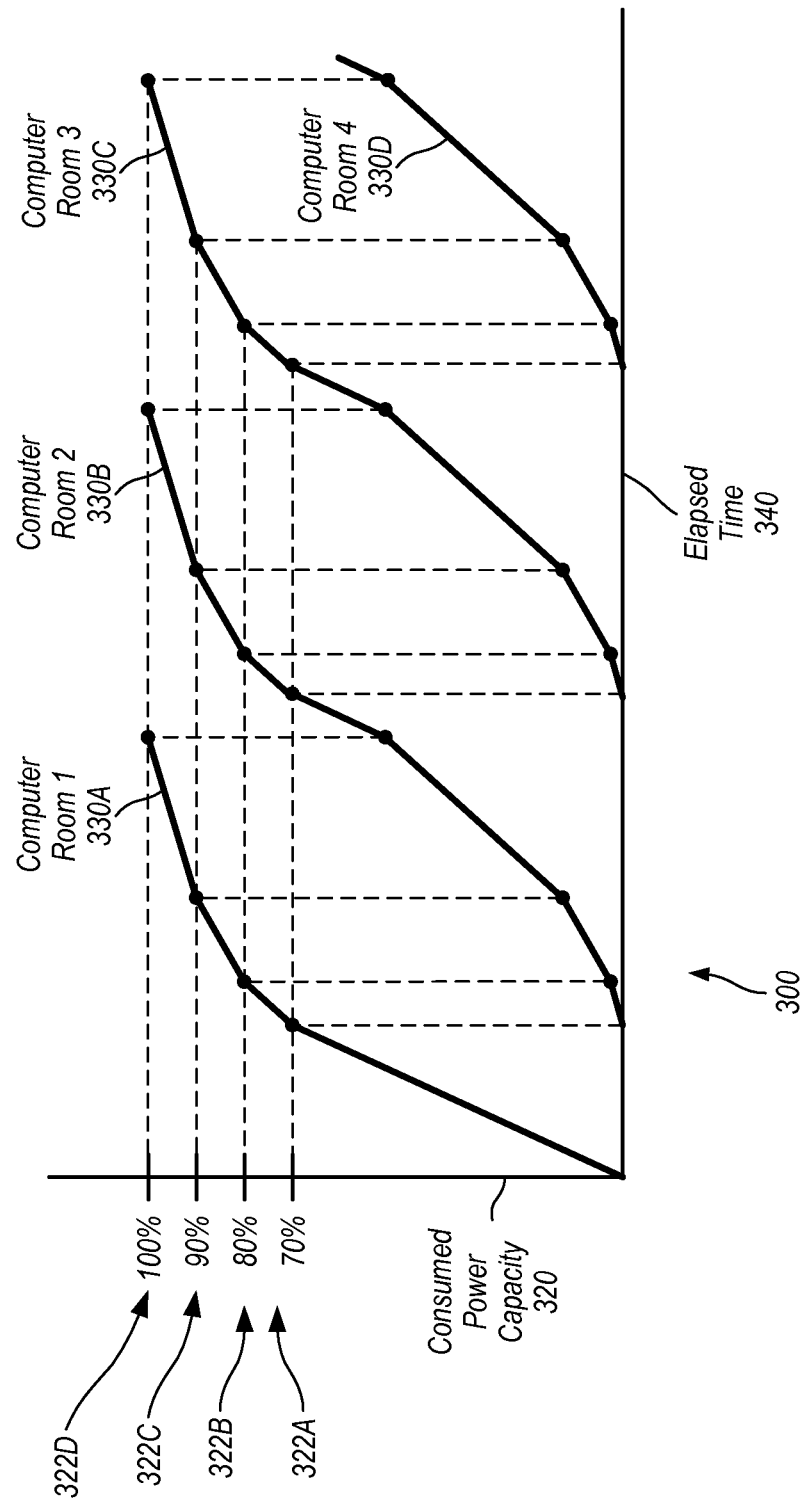
FIG. 3 illustrates variation of rack installation rates and sequential initiation of rack installation in data center computer rooms based on power consumption by installed racks, according to some embodiments.

FIG. 3 illustrates variation of rack installation rates and sequential initiation of rack installation in data center computer rooms based on power consumption by installed racks, according to some embodiments.

In some embodiments, where a data center includes multiple computer rooms, a rack installation control system can adjustably control rack installation rates for multiple various computer rooms, such that racks are installed in one room until electrical power consumption by installed racks in the room reach a first threshold, at which point the rack installation control system adjustably controls rack installation rates in the first room and another room to gradually shift rack installation from the first room to the next room, based on the electrical power consumption by installed racks in the room reaching additional thresholds. As a result, the rack installation control system can reduce the rack installation in the first room as the electrical power consumption by installed racks in the first room approaches a final threshold. Once electrical power consumption by installed racks in the first room reaches the final threshold, the rack installation control system can terminate rack installation in the first room and transfer all rack installation to the next room. The rack installation control system can repeat the adjusting for the next room and additional subsequent rooms until all computer rooms in the data center are filled with installed racks which fully utilize the corresponding power distribution systems for the respective computer rooms.

FIG. 3 illustrates a graphical representation 300 of the variation in electrical power consumption 330A-D in four computer rooms located in a data center, where a rack installation control system adjusts rack installation rates in one or more of the computer rooms as racks are progressively installed in the one or more computer rooms, so that rack installation is gradually transferred from one computer room to another as electrical power consumption by installed racks in the one computer room approach a power supply capacity of the corresponding power distribution system for that one computer room.

As shown, the rack installation control system adjusts rack installation rates in one or more computer rooms based on electrical power consumption in a computer room reaching one or more of four threshold 322A-D proportions of the power supply capacity 320 of the corresponding power distribution system for that respective computer room over elapsed time 340. Racks are installed in the first computer room at a rate which equals a rack delivery rate for the data center until the electrical power consumption by installed racks in the first room 330A reaches the first threshold 322A, after which the rack installation rate for the first room is decreased and rack installation in the second room is concurrently initiated and gradually increased in rack installation rate until the electrical power consumption 330A reaches the final threshold value 322D, at which point the rack installation control system terminates rack installation in the first room and transfers all rack installation to the second room until electrical power consumption by installed racks in the second room reaches the first threshold value 322A, at which point the rack installation control system repeats the process with a third, and then a fourth, computer room. The illustrated progressive installation of racks in multiple computer rooms is not limited to a particular number of computer rooms; it will be understood that the rack installation control system can adjustably control rack installation rates in any number of computer rooms, including computer rooms in separate data centers.

Figure 4:
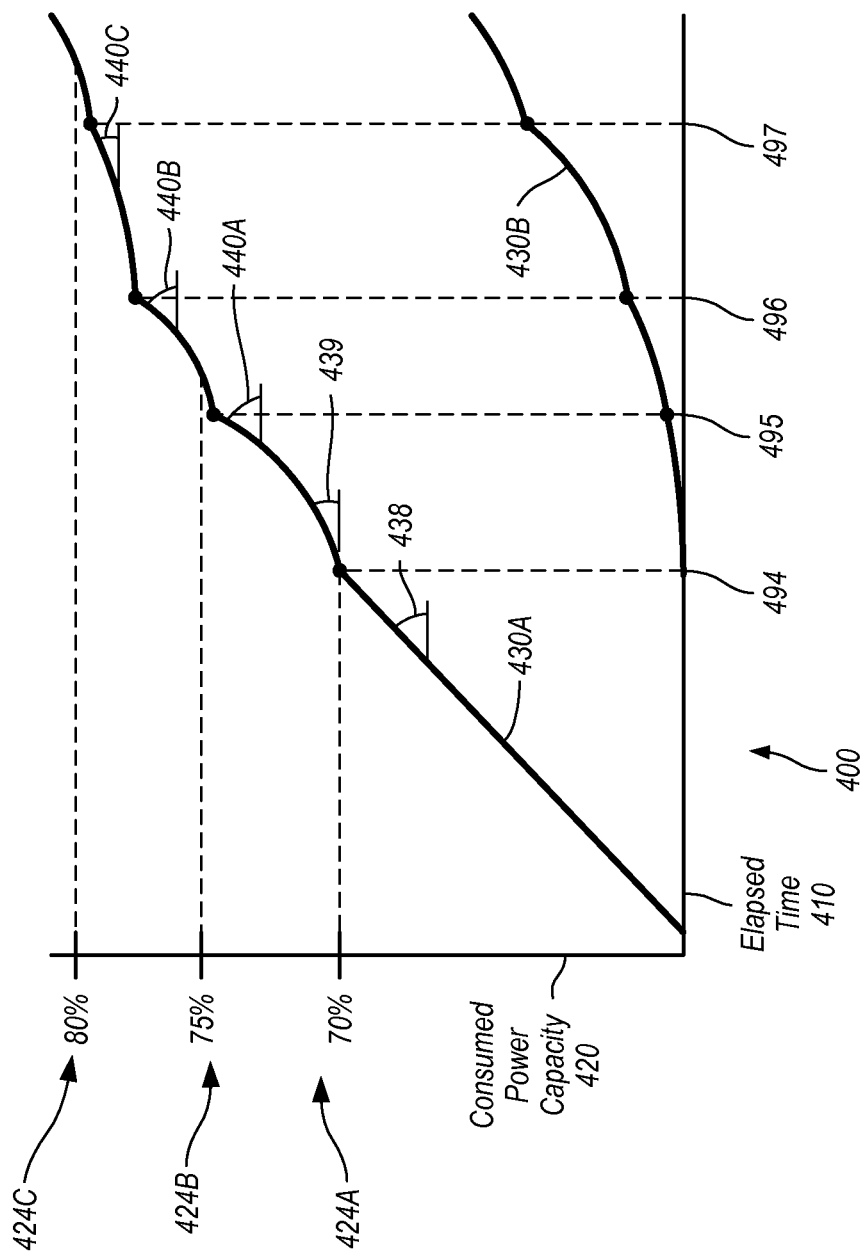
FIG. 4 illustrates variation of rack installation rates based on variable rates of change of power consumption by installed racks, according to some embodiments.

FIG. 4 illustrates variation of rack installation rates based on variable rates of change of power consumption by installed racks, according to some embodiments.

In some embodiments, a rack installation control system adjusts rack installation rates for one or more computer rooms, based at least in part upon a rate at which electrical power consumption by the installed racks in the one or more computer rooms changes over one or more periods of elapsed time. Such adjustment can preclude electrical power consumption from changing at a rate which raises the likelihood that electrical power consumption by already-installed racks might increase to exceed the power supply capacity of the corresponding power distribution system.

Based on the rate of electrical power consumption change reaching a threshold value, the rack installation control system can adjust the rack installation rate for the computer room to adjust the rate of electrical power consumption change to a certain value. The graphical representation 400 illustrates variation in electrical power consumption 430A, 430B in two computer rooms over elapsed time 410, based at least in part upon adjustments to rack installation rates for the computer rooms by a rack installation control system. As shown upon the electrical power consumption 430A by installed racks in a first computer room reaching a first threshold value 424A proportion of the power supply capacity 420 of a corresponding power distribution system, a rack installation control system can reduce the rack installation rate for the first computer room by a certain amount, and concurrently initiate rack installation in a second computer room at the same certain amount. As shown, such an adjustment, occurring at time 494, results in the rate of change of electrical power consumption 430A dropping from an initial rate 438 to a lower rate 439.

The graphical representation 400 shows rack installation initially proceeding at a fixed rate, where the electrical power supply requirements of the installed racks are initially constant until at least time 494. As a result, and as shown in FIG. 4, electrical power consumption 430A increases at a fixed rate 438 until at least time 494.

As further shown, subsequent to the adjustment in rack installation rates for the first and second computer rooms at time 494, based on the consumption 430A reaching a first threshold value 424A, the rate of change of electrical power consumption 430A, B begins to increase, such that a rate of change of electrical power consumption 430A increases, over time 410, to a greater value 440A than the rate 439 immediately after time 494. In some embodiments, the rate 440A can equal a threshold rate, such that, in response to determining, at time 495, that the rate 440A of change of electrical power consumption 430A by installed racks in the first computer room has reached the threshold rate, the rack installation control system adjusts the rack installation rate for the first computer room to a reduced rate, so that the rate of change of electrical power consumption 430A by installed racks in the first computer room is reduced to a lesser rate than rate 440A.

In some embodiments, the adjustment can include reducing the rate to a particular threshold rate which is associated with a particular threshold value 424B of electrical power consumption. As shown, the adjustment can be commanded by the rack installation control system when electrical power consumption 430A is not yet reached a threshold value 424B. In some embodiments, including the illustrated embodiment, the rack installation control system can disregard the next threshold value 424B, such that the rack installation rates in the first and second computer rooms are not adjusted when the electrical power consumption 430A reaches the next threshold 424B, based at least in part upon such an adjustment having already been commanded when the rate of change of electrical power consumption 430A by installed racks in the first computer room was determined to have reached the threshold rate.

The fluctuations in the rate of change of electrical power consumption by installed racks in one or more computer rooms can be based at least in part upon one or more factors, including rack power supply requirements of installed racks, rack delivery rates for a data center in which the computer rooms are located, etc. For example, where racks which are initially installed have a power supply requirement of 5 KVa, but later-installed racks have greater power supply requirements, the rate of change of electrical power consumption by installed racks in one or more computer rooms can increase over time, even though the rate at which racks are installed in the computer rooms does not change. In another example, where the rack installation rates for computer rooms in a data center are determined to be particular proportions of the rack delivery rate for the data center, and the rack delivery rate increases over time, the number of racks installed in one or more computer rooms in a given period of elapsed time can increase, thereby leading to an increase in the rate of change of electrical power consumption by installed racks in one or more computer rooms over time.

As further shown in FIG. 4, the rack installation control system can repeatedly adjust the rack installation rates for computer rooms based on electrical power consumption by installed racks in one or more computer rooms reaching one or more various thresholds. Such adjustments can occur repeatedly while electrical power consumption is between adjacent threshold power consumption amount thresholds. For example, as shown in FIG. 4, at time 496 and time 497, the rack installation control system commands two additional adjustments in the rack installation rates for the first and second computer rooms when the rate of change of the electrical power consumption 430 by installed racks in the first computer room reaches another threshold rate 440B and later reaches yet another threshold rate 440C. In some embodiments, the various threshold rates are each different rates. For example, in the illustrated embodiment, each subsequently-reached threshold rate 440A-C is a lesser rate than the preceding threshold rate. As a result, the rack installation rate can be adjusted to approach the final threshold at progressively reduced rates.

Figures 5A, 5B:
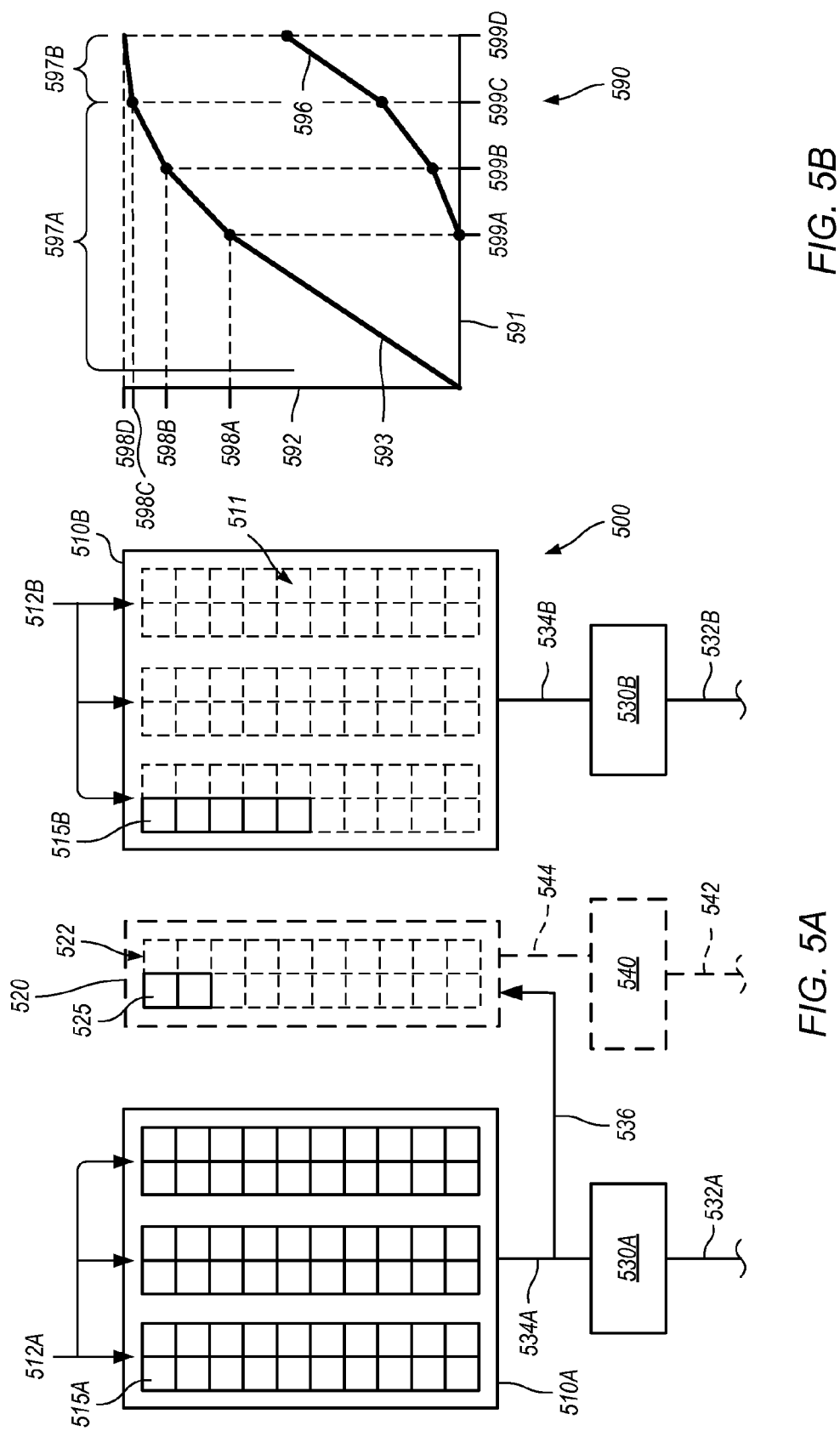
FIGS. 5A-B illustrates installation of rack computer systems in additional rack spaces, concurrently with installation of rack computer systems in primary computer rooms, according to some embodiments.

FIGS. 5A-B illustrates installation of rack computer systems in additional rack spaces, concurrently with installation of rack computer systems in primary computer rooms, according to some embodiments.

In some embodiments, a computer room includes a particular, predetermined, configuration of rack positions in which racks can be installed. The particular configuration can include a particular number of rack positions. As a result, a computer room can be restricted to a maximum number of installed racks which equals the particular number. In some embodiments, a corresponding power distribution system for the computer room can be fully utilized prior to installing racks in all of the rack positions in the computer room, thereby optimizing power supply utilization.

In some embodiments, a corresponding power distribution system for a computer room can be undersubscribed, even though racks are installed in all of the rack positions of the computer room. For example, where a computer room includes 300 predetermined rack positions, and a corresponding a power distribution system for the computer room is configured to supply sufficient electrical power to support 300 hypothetical installed racks, where the 300 racks are estimated to each consume approximately 10 KVa, such that the power distribution system is configured to supply 3000 KVa, but the actually installed racks consume approximately 8 KVa, approximately 600 KVa of power supply capacity remains available when 300 of the racks are actually installed in the computer room, thereby "filling" the computer room with racks. As a result, the power distribution system is undersubscribed.

In some embodiments, a data center includes an expansion area which corresponds to a computer room, where the expansion area includes a set of additional rack spaces in which additional racks can be installed, and where the corresponding power distribution system can be configured to supply electrical power to both the computer room and the corresponding expansion area. Additional racks can be installed in the expansion area until the corresponding power distribution system is fully subscribed or the additional rack positions in the expansion area are "filled" with installed additional racks.

In some embodiments, where a data center includes a power distribution system which corresponds to both a computer room and an expansion area is fully utilized by the installed racks in a computer room, an additional power distribution system can be installed in the data center, where the additional power distribution system is configured to supply electrical power to the expansion area. The additional power distribution system can be configured differently than the corresponding power distribution system for the computer room and expansion area. In particular, the additional power distribution system can be configured to supply electrical power to a particular number of installed racks which matches the number of rack positions in one or more expansion areas, rather than the number of rack positions in one or more computer rooms. As a result, the additional power distribution can be larger or smaller than the corresponding power distribution system, as the additional power distribution system can be configured to supply sufficient electrical power to support more or less installed racks than the corresponding power distribution system. As a result of installing the additional power distribution system, the expansion area can be utilized, even though the corresponding power distribution system is already fully utilized by the corresponding computer room, thereby optimizing utilization of the physical space of the data center in which the computer room and expansion area are located.

A rack installation control system can command the installation of additional racks in an expansion area, the installation of an additional power distribution system in the data center, configuration of a power distribution system to supply electrical power to the expansion area, some combination thereof, based on various determinations. For example, the rack installation control system can command installation of various infrastructure to electrically couple a power distribution system to a corresponding expansion area based at least in part upon a determination that, with a particular confidence level, a probability that a power distribution system will be undersubscribed by the corresponding computer room exceeds a threshold probability (e.g., 95%). The power distribution system can be initially electrically isolated from the corresponding expansion area, so that infrastructure to electrically couple the power distribution system to the expansion are is not installed unless the power distribution system is likely to be used to supply power to additional racks in the expansion area, thereby saving on capital expenditures. In another example, the rack installation control system can command installation of an additional power distribution system in a data center, and installation of infrastructure to electrically couple the additional power distribution system to the expansion area, based at least in part upon a determination that that, with a particular confidence level, a probability that a power distribution system will be fully utilized by the corresponding computer room exceeds a threshold probability (e.g., 95%).

As shown in FIG. 5A, a data center 500 includes computer rooms 510A-B and corresponding power distribution systems 530A-B, where each computer room includes multiple sets 512A, 512B of rack positions 511, where the rack positions in room 510A are filled with racks 515A while a limited number of rack positions in room 510B are filled with installed racks 515B. In addition, data center 500 includes an expansion area 520 which corresponds to the computer room 510A and power distribution system 530A, as a rack installation control system can command installation of additional racks in the expansion area, at one or more determined rack installation rate, based at least in part upon a determination that the rack positions in the computer room 510A will be, or are, filled with installed racks and that at least a minimum amount of power supply capacity of system 530A remains when the computer room 510A is filled with installed racks 515A. The expansion area 520 includes a set 522 of rack positions which are at least partially being filled with installed additional racks 525.

As shown, the power distribution system 530, which receives electrical power from a power feed 532A and supplies electrical power to installed racks in computer room 510A via infrastructure 534A, is configured, via electrical coupling with expansion area 520 via infrastructure 536, to supply electrical power to the installed additional racks 525 in area 520. As a result, system 530A can be referred to as being "common" to both room 510A and area 520. In addition, as shown, computer room 510B has a separate corresponding power distribution system 530B which receives electrical power from a power feed 532B and supplies electrical power to computer room 510B via infrastructure 534B. Power sources 532A-B can be a common power feed, separate power feeds, some combination thereof, or the like.

As shown, an additional power distribution system 540 can be installed in data center 500, where the additional power distribution system 540 can be configured to receive electrical power from a power feed 542 and supply electrical power to at least expansion area 520, via installed infrastructure 544. As referred to herein, one or more of instances of infrastructure 534A-B, 536, and 544 can include one or more instances of power line infrastructure, including one or more instances of bus bars, busways, power cables, some combination thereof, or the like.

As shown, a rack installation control system can command concurrent rack installation in both a corresponding expansion area of a filled computer room and another separate computer room. The rack installation control system can adjust rack installation rates for the first and second computer rooms based on electrical power consumption by installed racks in the first computer room reaching various thresholds, and rack installation in the first computer room can be terminated based on the computer room being filled with installed racks. Based on a determination that the computer room is filled, a rack installation control system can command initiating rack installation in a corresponding expansion area. The rack installation control system can command that racks be installed in the expansion area at a particular determined rack installation rate, which can be a last rack installation rate for the corresponding computer room prior to rack installation termination for that computer room. In some embodiments, the rack installation rate determined for the expansion area is different than the last rack installation rate for the corresponding computer room, and the rack installation rate of the next computer room in which racks are presently being installed can be adjusted, by the rack installation control system, concurrently with initiating rack installation in the expansion area, so that the instantaneous total rack installation rate across the multiple computer rooms and expansion areas remains the same. For example, where a last rack installation rate for a first computer room, prior to the first computer room becoming filled, is 5 racks per week, and a concurrent rack installation rate for a next computer room is 8 racks per week, the rack installation control system can respond to a determination that the first computer room is filled and the corresponding power distribution system is undersubscribed by at least a threshold amount by commanding the initiation of rack installation in a corresponding expansion area at a rack installation rate of 3 racks per week and further commanding an adjustment to the rack installation rate for the next computer room to a rate of 10 racks per week.

FIG. 5B illustrates the variation of electrical power consumption in the various computer rooms and expansion areas in data center 500, as a relationship between the consumed power supply capacity 592 of one or more corresponding power distribution systems with elapsed time 591. Curve 593 illustrates electrical power consumption by the installed racks in computer room 510A and expansion area 520 over time, as the installed racks 515A, 525 in both room 510A and area 520 consume electrical power from the same power distribution system 530A. Curve 596 illustrates electrical power consumption by the installed racks 515B in computer room 510B over time.

Portion 597A of curve 593 shows the increase in electrical power consumption by racks 515A as the racks are installed in room 510A over time. As the electrical power consumption by the installed racks 515A reaches various thresholds 296 598A-C, the rack installation rate for room 510A is adjusted, and rack installation is first initiated in computer room 510B at time 599A when power consumption 593 by racks 515A installed in room 510A reaches threshold value 598A, and the rack installation rate for room 510B is progressively increased over time as electrical power consumption by racks 515A installed in room 510A progressively reaches subsequent threshold values 598B, 598C at times 599B, 599C, respectively. At time 599C, a rack installation control system determines that the number of racks 515A installed in room 510A has reached the particular number of rack positions in the computer room 510A, i.e., that the computer room 510A is filled with racks. In addition, at time 599C, the rack installation control system determines that at least a certain minimum amount of available power supply capacity of power distribution system 530A remains, i.e., that system 530A is undersubscribed. As a result, as shown in FIGS. 5A-B, the rack installation control system terminates rack installation in room 510A, initiates rack installation in expansion area 520 at a rack installation rate which is less than the last rack installation rate for room 510A, and adjusts the rack installation rate for room 510B to compensate for the difference between the last rack installation rate for room 510A and the initial rack installation rate for area 520. As shown, from time 599C to time 599D, the portion 597B of the curve 593 shows the increase in electrical power consumption by electrical power supplied by system 530A, by the additional racks 525 installed in area 520. The increase in electrical power consumption shown in portion 597B shows electrical power consumption increasing at a lesser rate than from time 599B-C, based on the rack installation rate for area 520 being less than the rack installation rate for computer room 510A immediately preceding time 599C. In addition, as shown in FIG. 5B, at time 599D the electrical power consumption shown by curve 593 reaches the final threshold 598D which corresponds to the power supply capacity of system 530A, thereby indicating that, at time 599D, system 530A is fully utilized by the installed racks 515A, 525 in room 510A and area 530. In some embodiments, at time 599D, the rack positions 522 in area 520 are partially filled, such that at least some unoccupied rack positions are present. At time 599D, based at least in part upon a determination that the electrical power consumption by the installed racks 515A, 525 has reached the final threshold value 598D, the rack installation control system can terminate rack installation in area 520, adjust the rack installation rate for room 510B to include the rack installation rate for the expansion area immediately preceding termination of rack installation therein, some combination thereof, etc. In some embodiments, the rack installation control system can adjust the rack installation rate for are 520 based at least in part upon the electrical power consumption shown by curve 593 reaching one or more various threshold values.

In some embodiments, one or more various configurations of power line infrastructure can be installed in a given expansion area, based at least in part upon the determined available power supply capacity of the power distribution system which can be configured to supply electrical power to the expansion area. Where the available power supply capacity is estimated to be sufficient to partially fill the expansion area, instances of power line infrastructure which are configured to provide electrical power support to a particular limited portion of the rack positions in the expansion area can be installed, and where the available power supply capacity is estimated to be sufficient to completely fill the expansion area, instances of power line infrastructure which are configured to provide electrical power support to all of the rack positions in the expansion area can be installed. Such configurations of power line infrastructure can be selected and commanded to be installed by a rack installation control system, based at least in part upon a determination that a certain amount of available power supply capacity is determined to remain upon filling the corresponding computer room with installed racks. In one example, the rack installation control system can determine whether to command installation of a single 800-amp busway, or two 400-amp busways, in an expansion area based at least in part upon the determined amount of available power supply capacity of the power distribution system which can be configured to supply electrical power to the expansion area upon the corresponding computer room being filled with installed racks.

Figure 6:
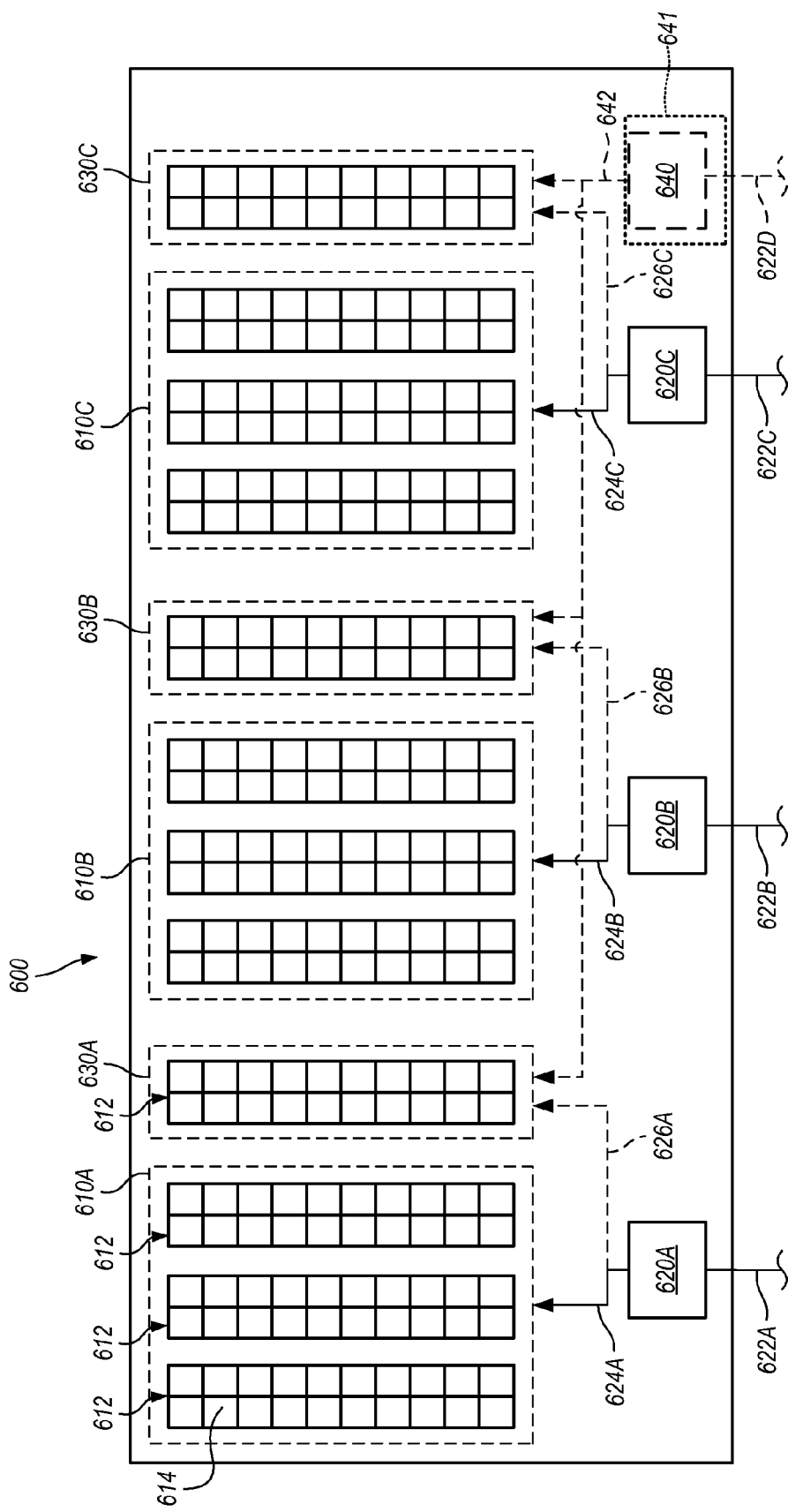
FIG. 6 is a schematic diagram illustrating a data center including computer rooms, associated and physically-proximate expansion spaces, and power distribution systems which supply power to pairs of computer rooms and expansion spaces, according to some embodiments.

FIG. 6 is a schematic diagram illustrating a data center including computer rooms, associated and physically-proximate expansion spaces, and power distribution systems which supply power to pairs of computer rooms and expansion spaces, according to some embodiments. Data center 600 can be included in any of the embodiments included herein.

Data center 600 can include a single interior enclosure in which multiple computer rooms are located within the enclosure, a set of multiple enclosures where separate computer rooms are included in separate enclosures, some combination thereof, or the like. In some embodiments, the data center includes multiple power distribution systems, where separate power distribution systems are installed in separate enclosures. In some embodiments, one or more power distribution systems are installed in a location, within a data center, which is physically proximate to at least a computer room to which the one or more power distribution systems are configured to supply electrical power.

In some embodiments, a data center includes multiple computer rooms and corresponding expansion areas for each of the multiple computer rooms. Each computer room and corresponding expansion area can be referred to as a "pair" of computer room and expansion area, based at least in part upon both of the computer room and expansion area in the "pair" being configured to receive electrical power supplied by a common power distribution system. In some embodiments, more than one computer room, expansion area, some combination thereof, etc. are configured to receive electrical power supplied by a common power distribution system; such computer rooms, expansion areas, etc. can be referred to as being part of a common "set" of computer rooms and expansion areas.

Data center 600 includes multiple computer rooms 610A-C, multiple installed power distribution systems 620A-C, and multiple expansion areas 630A-C. Each computer room and expansion area includes one or more sets 612 of rack positions 614 which can accommodate installed racks.

As shown, each separate power distribution system 620A-C is configured to receive power from a power feed 622A-C and supply power to an individual corresponding computer room 610A-C via one or more particular instances of power line infrastructure 624A-C. For example, power distribution system 620A is electrically coupled to a power feed 622A and is electrically coupled to one or more instances 624A of power line infrastructure which electrically couple a power output of system 620A to at least one instance of power line infrastructure in computer room 610A, such that system 620A is configured to supply electrical power to racks installed in any of the rack positions 614 in room 610A. As shown herein, the power feeds 622A-C can be a common power feed, separate power feeds, some combination thereof, etc.

In some embodiments, a power distribution system can be configured to supply electrical power to a corresponding expansion area, based at least in part upon a determination, by a rack installation control system, that the power distribution system will be undersubscribed upon installing racks in each of the computer room to which the power distribution system is configured to supply electrical power. Such configuration can include electrically coupling the power distribution system to one or more instances of power line infrastructure which electrically couple the power distribution system to one or more instances of power line infrastructure included in the expansion area. Such configuration can occur after initial installation of the power distribution system and after initiation of rack installation in the computer room, prior to completing rack installation in all of the rack positions in the computer room, some combination thereof, etc. For example, in the illustrated embodiment, system 620A is presently electrically coupled to computer room 610A via power line infrastructure 624A, which can include one or more instances of power transmission lines, power busways, power cabling, some combination thereof, or the like, but is presently not electrically coupled to the corresponding expansion area 630A.

In some embodiments, based on a determination that the system 620A will be undersubscribed by room 610A, which can include a determination that the available power supply capacity of system 620A when all rack positions 614 in room 610A are occupied by installed racks will exceed a certain threshold value, additional instances of power line infrastructure 626A can be installed in the data center 600, such that system 620A is electrically coupled to power line infrastructure in area 630A, thereby configuring the system 620A to supply electrical power to additional racks installed in the rack positions 612 of area 630A. In some embodiments, the power line infrastructure 626A is installed prior to initiating rack installation in room 610, concurrently with installing infrastructure 624A, some combination thereof, etc.

In some embodiments, the physical locations of computer rooms and expansion areas in a data center are predetermined prior to initiation of rack installation in one or more of the computer rooms and expansion areas. For example, in the illustrated embodiments, the computer rooms 610A-C and expansion areas 630A-C, and rack positions 614 therein, can be predetermined prior to installation of racks in any of the rack positions 612. Such predetermination can be included in configuring one or more computer rooms, expansion areas, etc. to accommodate installed racks.

In some embodiments, a given computer room, expansion area, etc. is initially at least partially un-configured to accommodate installed racks and is fully configured to accommodate installed racks as part of initiating installation of racks in the respective computer room, expansion area, etc. For example, in the illustrated embodiment, computer room 610B may initially not include any interior power line infrastructure, including busways, power distribution units (PDUs), cable trays, network switch devices, etc. Based on electrical power consumption by installed racks in room 610A, a rack installation control system can command initiation of rack installation in room 610B, and such an initiation of rack installation can include installing remaining instances of infrastructure to fully configure the room 610B to accommodate installed racks.

Such installation of remaining instances of infrastructure can include installing busways configured to distribute electrical power to racks, installing transfer switches and branch circuits, installing cable trays, installing network switches, some combination thereof, etc. As a result, where the rack installation control system command initiation of rack installation in one room based on electrical power consumption by installed racks in another room, while racks are still being installed in the other room, and sufficient available power supply capacity for that other room, initiating installation for the one room, while includes installing the remaining infrastructure, can result in the infrastructure being installed "just in time" to support installed racks. Infrastructure need not remain idle in a computer room; rather, the installation of at least some infrastructure can be delayed until a command is generated by the rack installation control system to initiate rack installation in the computer room.

Upon completion of installation of the remaining infrastructure, actual installation of racks in the computer room may commence. Initiating rack installation in one room, while continuing to install racks in another room, can result in the next room being prepared for rack installation prior to the first computer room being exhausted of either rack positions or available power supply capacity. As a result, the next computer room can be prepared to accommodate unexpected surges in rack installation requirements, including a surface in rack deliveries, a short-notice requirement for additional computing capacity in the next room, etc.

In some embodiments, where one or more power distribution systems are fully utilized by installed racks in the corresponding computer room, an additional power distribution system can be configured to supply electrical power to the corresponding expansion area, such that the expansion rack positions located in the expansion area can be utilized by rack computer systems. Such an additional power distribution system can be initially absent from the data center, and the rack installation control system can command installation of the additional power distribution system upon a determination that one or more power distribution systems is likely (e.g., a probability exceeding a certain threshold) to be fully utilized by installed racks in a corresponding computer room.

As shown in FIG. 6, for example, data center 600 includes an expansion area 641 which is configured to accommodate an additional power distribution system 640. The system 640 can be initially absent from data center 600, and a rack installation control system can command installation of system 640 based at least in part upon a determination, at the rack installation control system, that one or more of the power distribution systems 620A-C is likely to be fully utilized by installed racks in a corresponding computer room. Installing an additional power distribution system 640 can include installing one or more instances of power line infrastructure, such that the additional power distribution system 640 is electrically coupled to a power feed and is electrically coupled each expansion zone which corresponds to the computer room which fully utilizes a power distribution system 620A-C. Such instances of power line infrastructure can include one or more instances of power line infrastructure which electrically couples system 640 to a power feed 622D. Power feed 622D can be a different power feed than one or more of power feeds 622A-C, common to one of power feeds 622A-C, some combination thereof, or the like. Such instances of power line infrastructure can include one or more instances 642 which can electrically couple system 640 to one or more expansion areas 630A-C.

Instances of power line infrastructure 642, which can include one or more instances of power busways, power cabling, etc. can be progressively installed over time to selectively couple system 640 to selected expansion areas which correspond to computer rooms which are determined to fully utilize a power distribution system corresponding to the computer room and expansion area. For example, based at least in part upon a determination that the racks installed in computer room 610A will fully utilize the power supply capacity of system 620A, a rack installation control system can command installation of system 640, which can include electrically coupling system 640 to power feed 622D and installing infrastructure 642 which selectively electrically couples system 640 to expansion area 630 so that additional rack computer systems installed in the rack positions 612 of area 630A consume electrical power supplied by power distribution system 640.

Where power distribution system 620B is undersubscribed by the racks installed in room 610B, infrastructure 626B can be installed to electrically couple system 620B to expansion area 630B, so that additional racks installed in area 630B consume electrical power supplied by system 620B, while system 640 may remain electrically decoupled from area 630B. In addition, where power distribution system 620C is subsequently determined to be undersubscribed by the racks installed in room 610C, additional infrastructure 642 can be installed so that system 640 is electrically coupled to both areas 630A and 630C, and racks installed in one of both areas 630A, C consume power supplied by system 640 via infrastructure 642, while racks installed in area 630B consume power supplied by system 620B.

In some embodiments, expansion areas are located physically proximate to the corresponding computer rooms. As shown in FIG. 6, for example, each expansion area 630A-C is located physically proximate to the corresponding computer room 610A-C of the respective expansion area. As a result, the power line infrastructure 626A-C which can electrically couple a power distribution system 620A-C to a corresponding expansion zone can be reduced in length. In some embodiments, a physically-proximate set of one or more computer rooms and one or more expansion areas can be physically incorporated into a common area within the data center 600.

Figure 7:
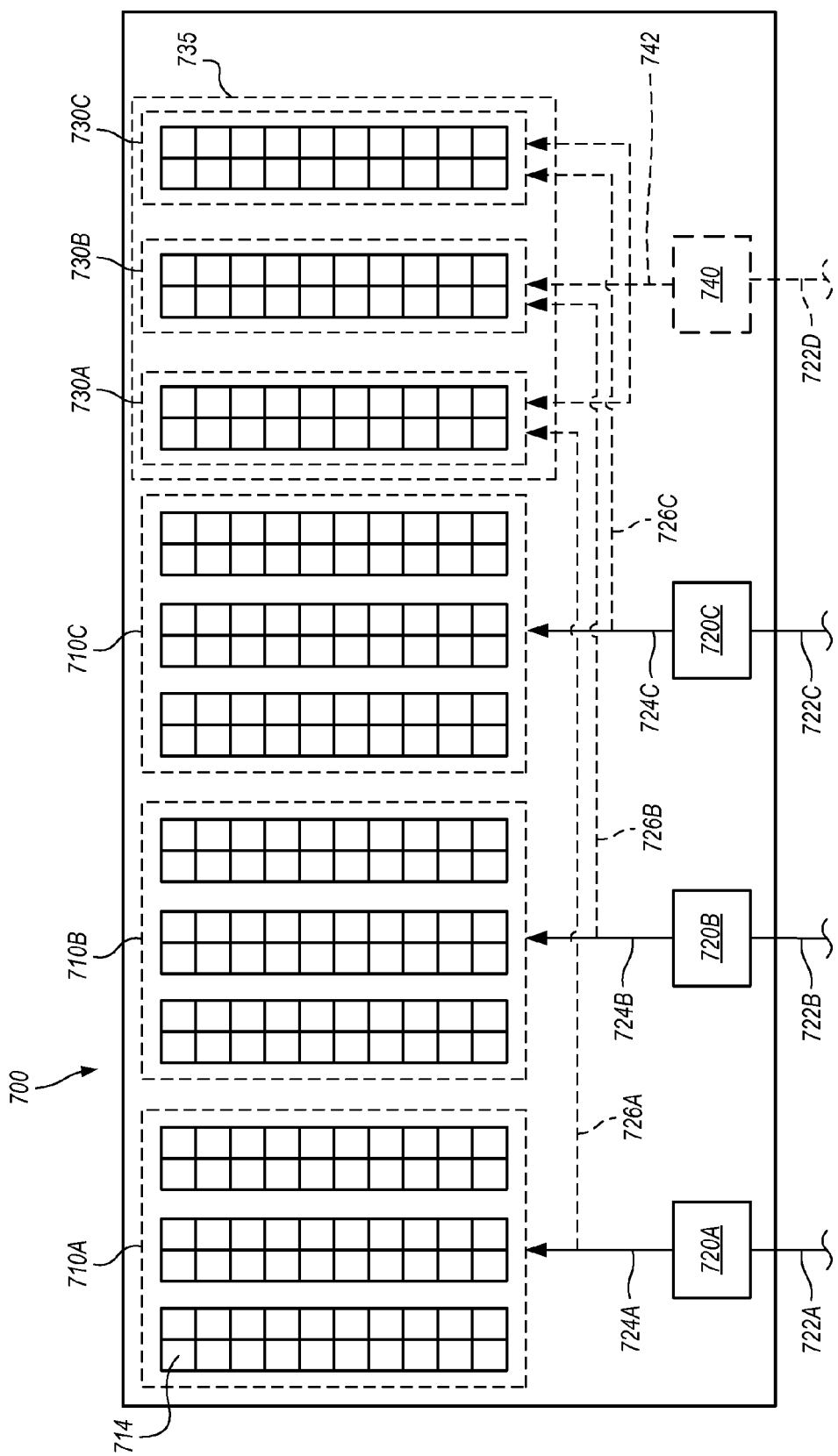
FIG. 7 is a schematic diagram illustrating a data center including computer rooms, associated and physically-remote expansion spaces, and power distribution systems which supply power to pairs of computer rooms and expansion spaces, according to some embodiments.

FIG. 7 is a schematic diagram illustrating a data center including computer rooms, associated and physically-remote expansion spaces, and power distribution systems which supply power to pairs of computer rooms and expansion spaces, according to some embodiments. Data center 700 can be included in any of the embodiments included herein.

In some embodiments, expansion areas are located in a common area, which can be physically remote from the corresponding computer rooms. Such a locating of expansion areas can result in a reduction in power line infrastructure which electrically couples one or more of the expansion areas to an additional power distribution system which can be installed in the data center.

FIG. 7 illustrates a data center 700 which includes three separate computer rooms 710A-C, corresponding power distribution systems 720A-C electrically coupled to the respective computer rooms via separate instances of power line infrastructure 724A-C, and three separate expansion areas 730A-C located in a common area 735 of the data center 700. As shown, while expansion area 730A corresponds to room 710A, area 730B corresponds to room 710B, and area 730C corresponds to room 710C, the areas 730A-C are located physically remote from the corresponding computer rooms 710A-C. As further shown additional power line infrastructure 726A-C can be coupled to the outputs of the power distribution systems 720A-C to electrically couple them to the corresponding expansion areas 730A-C. As shown, relative to the data center 700 shown in FIG. 7, the additional infrastructure 726A-C which can be installed to electrically couple one or more power distribution systems 720 and one or more expansion areas 730, where the expansion areas are located in a common area 735, can be more lengthy, and may be more extensive, that the infrastructure 726 which can be installed to electrically couple one or more power distribution systems 720 and one or more expansion areas 730 in data center 700.

As further shown, data center 700 can include an additional power distribution system 740, which can be installed and coupled to one or more expansion areas 730A-C, via one or more instances of power line infrastructure 742, based on a determination that a computer room corresponding to the respective expansion area is likely to fully utilize the corresponding power distribution system 720. As shown, the power distribution systems 720A-C, 740 can each be electrically coupled to one or more power feeds 722A-D.

Figure 8:
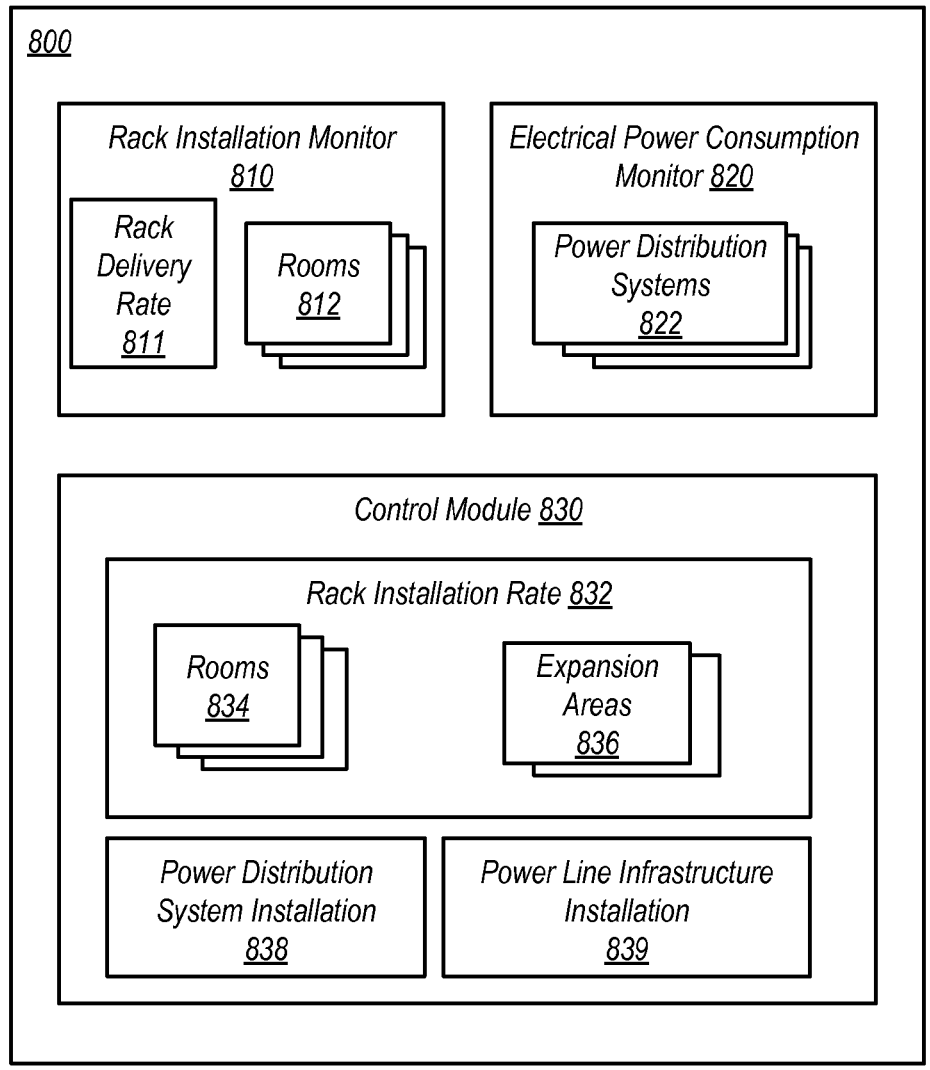
FIG. 8 is a block diagram illustrating a rack installation control system, according to some embodiments.

FIG. 8 is a block diagram illustrating a rack installation control system, according to some embodiments. The rack installation control system 800 can be implemented by one or more computer systems and can be included in any of the embodiments included herein.

Rack installation control system 800, also referred to herein interchangeably as "control system" 800, includes various modules, some embodiments of which are illustrated in FIG. 8. Control system 800 can be included in various locations, including one or more data centers which include computer rooms where racks are installed at rack installation rates controlled by control system 800, external to one or more data centers where racks are installed at rack installation rates controlled by control system 800, some combination thereof, etc.

In some embodiments, control system 800 includes a rack installation monitor module 810. Module 810 can be configured to monitor the rates at which racks are installed in various computer rooms in one or more data centers. In addition, module 810 can monitor the rates at which racks are delivered to one or more computer rooms. As shown, module 810 includes a rack delivery rate module 811 which can, based on data received from one or more of a rack supplier, rack installation manager included in the data center, etc. A rack supplier can include one or more of a rack vendor, an inventory storage site, etc. As further shown, module 810 includes one or more computer room installation monitor modules 812 which can monitor the number of racks installed in one or more computer rooms, expansion areas, etc. In addition, one or more modules 812 can monitor the number of rack positions in a given computer room, expansion area, etc. In some embodiments, one or more modules can, based on rack installation data indicating the number of rack positions in a given computer room, expansion area, etc. a determined rate at which racks are installed in the given computer room, expansion area, etc., the module 812 can track an occupancy rate for the given computer room, expansion area, etc. as a proportion of the rack positions therein which are occupied by installed racks. In some embodiments, the modules 812 can receive rack installation data based at least in part upon data received from one or more rack installation managers, data received from one or more routers, system consoles, etc. For example, a given module 812, based at least in part upon communication by control system 800 with system consoles of installed racks in a data center via one or more communication networks, can determine the number of installed racks in one or more computer rooms, expansion areas, etc. at one or more points in time.

In some embodiments, control system 800 includes an electrical power consumption monitor module 820. Module 820 can be configured to monitor electrical power consumption, by installed racks in one or more computer rooms, expansion areas, etc., of electrical power supplied by one or more corresponding power distribution systems ("PDSs"). As shown, module 820 can monitor electrical power consumption associated with one or more of a plurality of power distribution systems 822, which can include multiple power distribution systems in one or more data centers. Such monitoring can include monitoring power data received from one or more power sensors, which can be included in one or more of the power distribution systems, one or more instances of power line infrastructure which electrically couple one or more power distribution systems to one or more computer rooms, expansion areas, etc. For example, module 820 can, in some embodiments, receive power data from a UPS included in a given power distribution system, where the power data indicates an amount of electrical power supplied by the given power distribution system to installed racks in one or more corresponding computer rooms, expansion areas, etc. In some embodiments, module 820 can receive data from one or more of a power distribution system, installation manager, user-provided data received via one or more user interfaces, some combination thereof, etc. which indicates a power supply capacity of a given power distribution system. As a result, in some embodiments, module 820 can monitor the consumed power supply capacity, available power supply capacity, etc. of one or more power distribution systems.

In some embodiments, control system 800 includes a control module 830 which is configured to control rack installation in one or more computer rooms, expansion areas, etc. of one or more data centers. In some embodiments, control module 830 is configured to control additional power distribution system installation in one or more data centers. In some embodiments, control module 830 is configured to control installation of one or more instances of power line infrastructure in one or more data centers to electrically couple one or more selected power distribution systems to one or more selected expansion areas.

As shown, control module 830 can include a rack installation rate module 832 which can be configured to adjustably control rack installation rates for one or more computer rooms 834 and expansion areas 836 located in one or more data centers. Adjustably controlling rack installation rates, as described herein, can include determining a particular rack installation rate for a particular computer room, expansion area, etc. and generating one or more output commands which cause racks to be installed in the particular computer room, expansion area, etc. at the determined particular rack installation rate. In some embodiments, module 832 adjusts rack installation rate for one or more computer rooms, expansion areas, etc. based on monitoring electrical power consumption, by installed racks in the one or more computer rooms, expansion areas, etc. of electrical power supplied by one or more corresponding power distribution systems and determining that such electrical power consumption at least meets one or more consumption threshold values, consumption rate threshold rates, etc. Adjusting rack installation rates for one or more computer rooms, expansion areas, etc. can include initiating rack installation, terminating rack installation, some combination thereof, or the like for one or more computer rooms, expansion areas, etc.

As shown, module 830 can include a power distribution system installation module 838. Module 838, in some embodiments, is configured to command installation of one or more additional power distribution systems in one or more data centers, based at least in part upon a determination that one or more power distribution systems are fully utilized by installed racks in a corresponding computer room, such that less than a threshold amount of the power supply capacity of the power distribution system is available to supply to hypothetical additional racks installed in a corresponding expansion area. In some embodiments, module 838 is configured to determine a particular size, in terms of power supply capacity, of an additional power distribution system to be installed and command installation of the sized additional power distribution system. Sizing an additional power distribution system can include determining the number of rack positions in one or more expansion areas for which a corresponding power distribution system has less than a threshold amount of available power supply capacity, estimating a total electrical power consumption by installed additional racks in the one or more expansion areas where all rack positions in the one or more expansion areas are filled, and sizing the additional power distribution system to supply sufficient electrical power to support estimated total electrical power consumption.

As shown, module 830 can include a power line infrastructure installation module 839. The module 839 can command that one or more particular selected instances of power line infrastructure be installed to electrically couple one or more selected power distribution systems to one or more particular selected expansion areas. In some embodiments, module 839 commands installation of power line infrastructure to electrically couple a given power distribution system to a corresponding expansion area based at least in part upon a determination, at control system 800, that the given power distribution system is undersubscribed by the corresponding computer room. In some embodiments, module 839 commands installation of power line infrastructure to electrically couple an additional power distribution system to one or more selected expansion areas, based at least in part upon a determination, at control system 800, that the corresponding power distribution systems for the selected expansion areas are fully utilized by the corresponding computer rooms for the selected expansion areas. In some embodiments, module 839 selectively commands installation of a particular configuration of power line infrastructure in one or more computer rooms, expansion areas, etc. based at least in part upon a determined available power supply capacity of a corresponding power distribution system.

Figure 9:
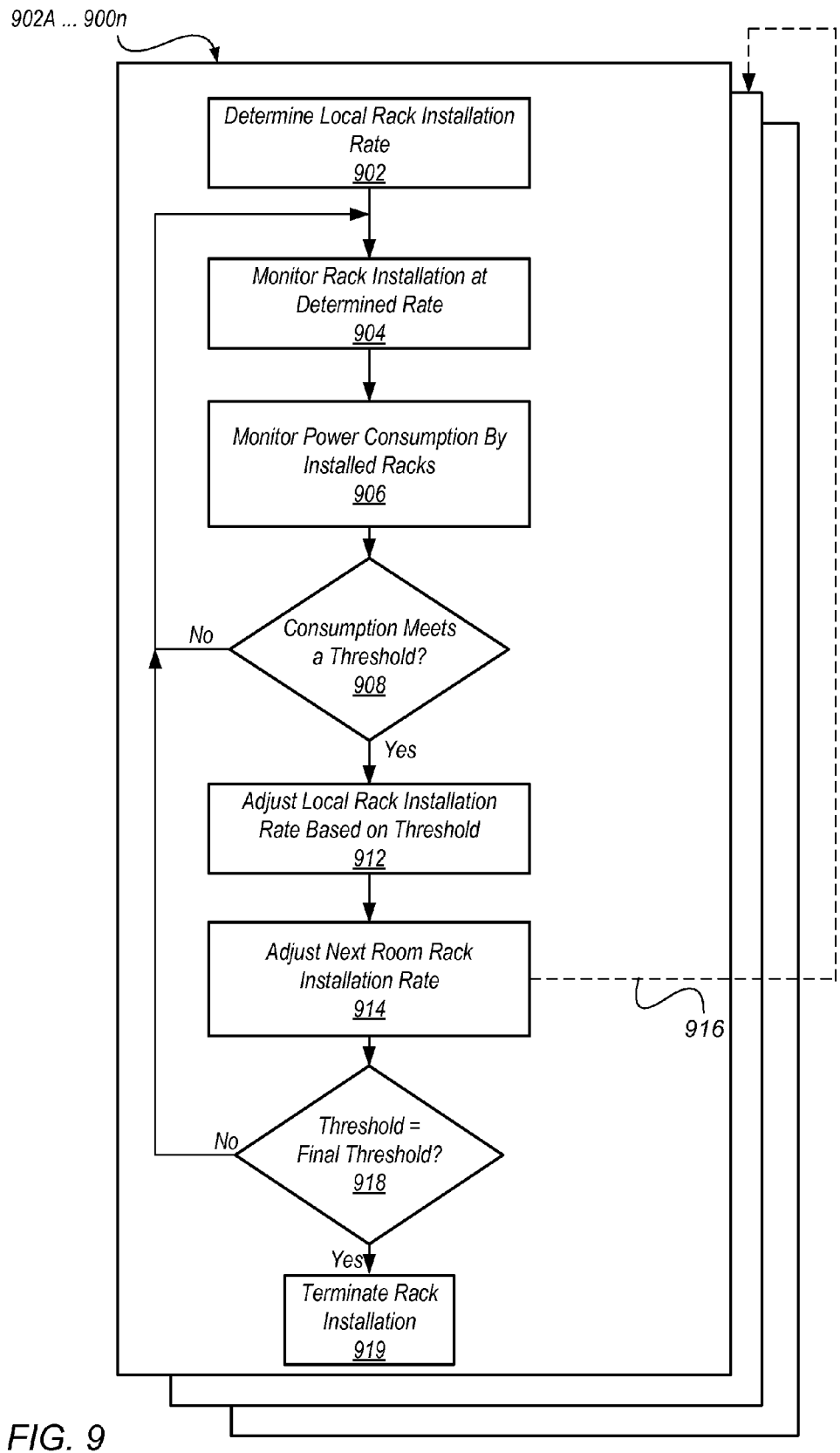
FIG. 9 illustrates managing the rate at which rack computer systems are installed in multiple computer rooms, according to some embodiments.

FIG. 9 illustrates managing the rate at which rack computer systems are installed in multiple computer rooms, according to some embodiments.

As shown in FIG. 9, rack installation can be managed for multiple computer rooms separately and in parallel. FIG. 9 shows multiple separate rack installation processes 900A-n. Each rack installation process 900 can include managing rack installation in a particular computer room of a data center, and multiple separate installation processes 900 can be controlled in parallel. In addition, as discussed further below, control of rack installation in a computer room, via a given process 900, can affect the control of rack installation in another separate computer room via another process 900.

At 902, a rack installation rate is determined for a computer room. The rack installation rack includes a rate at which rack computer systems are installed in the computer room. The rack installation rate can be determined as a proportion of a predetermined rate at which rack computer systems are delivered to a data center in which the computer room is included. For example, where rack computer systems are delivered to a data center at an average rate of 14 racks per week, the rack installation rate for a computer room can be determined to be 90% of the delivery rate. In some embodiments, where the rack delivery rate fluctuates over time, the rack installation rate can fluctuate based on the fluctuations of the rack delivery rate. For example, where the rack installation rate is determined to be 90% of the rack delivery rate, and the rack delivery rate increases within a time period from 14 racks per week to 20 racks per week, the rack installation rate can increase from 14 racks per week to 20 racks per week. In another example, the rack installation rate can be determined to be a particular quantity of rack computer systems within a particular time period. For example, the rack installation rate can be determined to the 14 rack computer systems per week.

At 904, rack computer installation in the computer room at the determined rack installation rate is commanded. A rack installation control system can command rack computer systems to be installed in available rack positions of a computer room at the determined rack installation rate. Commanding rack computer system installation can include commanding that rack computer systems delivered at a data center be mounted in particular available rack positions in the computer room, commanding that particular instances of infrastructure support be coupled to the mounted rack computer systems to link the rack computer systems to one or more instances of infrastructure support, including power support, communication support, etc.

At 906, the electrical power consumption by the power supplied to installed rack computer systems in the computer room by a power distribution system is monitored. A power distribution system can include an electrical power output of one or more uninterruptible power supplies (UPS). Monitoring power consumption can include monitoring a power supply capacity of the power distribution system, which can include a maximum amount of electrical power which the power distribution system is configured to supply. Monitoring power consumption can include monitoring the amount of electrical power supplied by the power distribution system to rack computer systems installed in the computer room. Such monitoring can also be referred to as monitoring the amount of electrical power consumed by the installed rack computer systems installed in the computer room. Such monitoring can be determined based at least in part upon power data received from one or more power sensors electrically coupled to one or more of the power distribution system and at least one of the installed rack computer systems. For example, a power sensor electrically coupled to an electrical output of the power distribution system can generate power data indicating an amount of electrical power supplied by the power distribution system. In another example, a power sensor electrically coupled to a power input of an installed rack computer system can generate power data indicating an amount of electrical power consumed by the rack computer system. Such power data can be received at a rack installation control system and processed to monitor power consumption in the computer room.

Monitoring power consumption, at 906, can include monitoring variation, over one or more periods of elapsed time, in electrical power consumption by the power supplied to installed rack computer systems in the computer room by a power distribution system. For example, over a period of elapsed time, as rack computer systems are installed in the computer room at the determined rack installation rate, electrical power consumption by the power supplied to installed rack computer systems in the computer room by a power distribution system can increase over the period. Such a change can be continuous, discontinuous, etc. and can proceed at different rates over time. For example, as a given rack computer system is installed the installed rack computer system can initially consumer a certain amount of power; as time passes, the rack computer system can be assigned to perform additional computing operations and the electrical power consumption by the installed rack computer system can increase with such an increase in performed computing operations.

At 908, a determination is made regarding whether the electrical power consumption by installed racks in the computer room at least meets one or more particular thresholds. Such thresholds can be predetermined, and can include a threshold amount of electrical power consumption, a threshold rate of change of electrical power consumption over one or more particular periods of elapsed time, some combination thereof, etc. If not, rack installation in the computer room continues at the determined rack installation rate.

If, as shown at 908 and 912, electrical power consumption by installed racks in a computer room is determined to at least meet a particular threshold, the rack installation rate for the computer room is adjusted to a particular new rack installation rate, where the adjustment is based at least in part upon the particular threshold. For example, where the met threshold is a particular threshold amount of electrical power consumption, the rack installation rate can be reduced to a particular proportion of a rack delivery rate for the data center in which the computer room is located. In another example, where the met threshold is a particular threshold rate of change of electrical power consumption, the rack installation rate can be reduced to a particular rate which is determined to correspond to a particular threshold rate of change of electrical power consumption. In some embodiments, the adjustment can include terminating rack installation in the particular computer room.

At 914, based at least in part upon the adjustment to the local rack installation rate for the computer room, the rack installation rate for at least one other particular computer room, expansion area, some combination thereof, or the like is adjusted. Such adjustment can include commanding the initiation of rack installation on the at least one other particular computer room, expansion area, some combination thereof, or the like. As shown by 916, such adjustment can include performing another process 900 for the at least one other particular computer room, expansion area, some combination thereof, or the like, where the adjusted rack installation rate determined at 914 is applied as the set rack installation rate for the at least one other particular computer room, expansion area, some combination thereof, or the like in the other process 900. As a result, in some embodiments, adjustments to rack installation rates for one or more computer rooms, expansion areas, etc. in one process 900 can result in adjustments to rack installation rate for one or more other computer rooms, expansion areas, etc. in one more other concurrently performed processes 900.

At 918, a determination is made regarding whether the threshold met at 908 includes a final threshold amount of electrical power consumption. The final threshold can include an amount of electrical power consumption by the installed racks which meets a power supply capacity of a corresponding power distribution system. In some embodiments, where the process 900 is performed for rack installation in an expansion area, the final threshold can include an amount of electrical power consumption by the installed racks in the expansion area which meets a different between the power supply capacity of the corresponding power distribution system and the electrical power consumption by installed racks in the corresponding computer room.

If, as shown at 918 and 919, the met threshold is determined to be a final threshold for the computer room, expansion area, etc. for which the given process 900 is performed, rack installation in the computer room, expansion area, etc. is commanded to be terminated. Such termination, in some embodiments, can be based at least in part upon an adjustment to the local rack installation rate, at 912, which results in a rack installation rate which is equal to zero racks over a given period of elapsed time.

Figure 10:
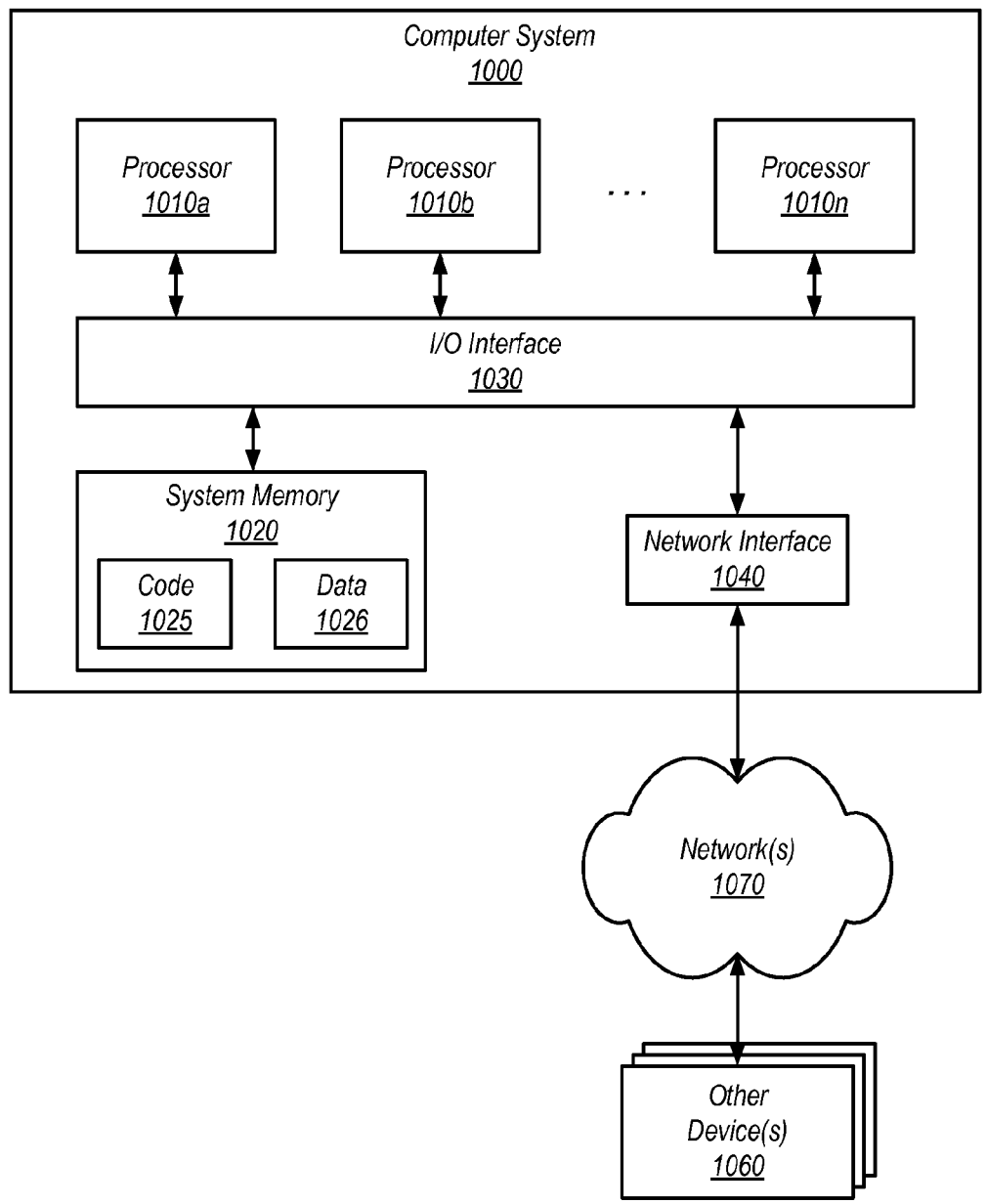
FIG. 10 is a block diagram illustrating an example computer system that may be used in some embodiments.

FIG. 10 is a block diagram illustrating an example computer system that may be used in some embodiments.

In some embodiments, a system that implements a portion or all of one or more of the technologies, including but not limited to a portion or all of apparatuses, methods and systems for rack installation control, rack installation rate monitoring and control, rack installation initiation in one or more computer rooms, expansion spaces, infrastructure installation, and various rack installation control methods, systems, devices, and apparatuses as described herein, may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as including but not limited to a portion or all of apparatuses, methods and systems for rack installation control, rack installation rate monitoring and control, rack installation initiation in one or more computer rooms, expansion spaces, infrastructure installation, and various rack installation control methods, systems, devices, and apparatuses as described herein, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data for implementing embodiments of rack installation control methods as described above relative to FIGS. 1-9. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory, computer readable storage medium storing a program of instructions that, when executed by at least one computer system, cause the at least one computer system to:

adjustably control a rate at which rack computer systems are to be installed in each computer room of a plurality of computer rooms in a data center, based at least in part upon electrical power consumed by the installed rack computer systems in each computer room, wherein the adjustably controlling comprises, for each individual computer room:

monitoring, over a period of elapsed time, a rate at which rack computer systems are installed in the individual computer room, wherein the rate at which rack computer systems are installed in the individual computer room over the period of elapsed time is an initial rate;

monitoring an increase, over the period of elapsed time, of electrical power consumption by the installed rack computer systems in the individual computer room as a proportion of a power supply capacity of a particular power distribution system supplying the consumed electrical power;

commanding a reduction of the rate at which rack computer systems are to be installed in the individual computer room, by a certain proportion of the initial rate, to a reduced rate, based at least in part upon a determination that the electrical power consumption, by the installed rack computer systems in the individual computer room, at least meets a particular threshold proportion of the power supply capacity of the particular power distribution system; and commanding an increase of a rate at which rack computer systems are to be installed in a different computer room, of the plurality of computer rooms, by the same certain proportion of the initial rate, such that the total rate at which rack computer systems are to be installed in the individual computer room and the different computer room is unchanged.

2. The non-transitory computer readable storage medium of claim 1, wherein:

commanding an increase of a rate at which rack computer systems are installed in the different computer room comprises commanding an initiation of installing rack computer systems in a computer room in which no rack computer systems are previously installed.

3. The non-transitory computer readable storage medium of claim 1, wherein:

each individual computer room, of the plurality of computer rooms in the data center, comprises a predetermined set of rack positions which are configured to accommodate a particular quantity of installed rack computer systems;

the data center comprises a plurality of sets of expansion rack positions, wherein each individual set of expansion rack positions is configured to receive electrical power from a common power distribution system relative to a corresponding computer room, such that each set of expansion rack positions is associated with a separate corresponding computer room; and the program of instructions, when executed by at least one computer system, causes the at least one computer system to:

command initiation of installation of additional rack computer systems in a particular set of expansion rack positions associated with a particular corresponding computer room, such that the installed additional rack computer systems consume electrical power supplied by the power distribution system which supplies electrical power to installed rack computer systems in the particular corresponding computer room, based at least in part upon a determination that both:

the particular corresponding computer room comprises the particular quantity of installed rack computer systems, and an available power supply capacity of the power distribution at least meets a certain threshold proportion of the power supply capacity.

4. The non-transitory computer readable storage medium of claim 3, wherein the program of instructions, when executed by at least one computer system, causes the at least one computer system to:

command initiation of installation of an additional power distribution system in a predetermined expansion area of the data center, such that the additional power distribution system is configured to supply electrical power to additional rack computer systems installed in a set of expansion rack positions, based at least in part upon at least a determination that the available power supply capacity of the particular power distribution is less than the certain threshold proportion.

5. A method, comprising:

monitoring electrical power consumption by rack computer systems installed in a particular computer room of a plurality of computer rooms, wherein rack computer systems are installed in the particular computer room at a rack installation rate which comprises an initial rate;

adjusting, by at least one computer system, the rack installation rate to a different rate, in response to a determination, by the at least one computer system, that the electrical power consumption by the installed rack computer systems in the particular computer room at least meets a particular threshold value, wherein the adjusting the rack installation rate to the different rate accounts for an adjustment to a rack installation rate for at least one separate computer room of the plurality of computer rooms, such that a total rack installation rate for the plurality of computer rooms is unchanged; and installing rack computer systems in the particular computer room at the different rate.

6. The method of claim 5, comprising:

adjusting the rack installation rate to the different rate based at least in part upon a determined rate at which the electrical power consumption by the installed rack computer systems in the particular computer room is determined to be changing over a particular period of elapsed time.

7. The method of claim 5, comprising:

adjusting a rack installation rate at which rack computer systems are installed in the at least one separate computer room, based at least in part upon the determination that the electrical power consumption by the installed rack computer systems in the particular computer room at least meets a particular threshold value.

8. The method of claim 7, wherein:

the rack installation rate at which rack computer systems are installed in the particular computer room, and the rack installation rate at which rack computer systems are installed in the at least one separate computer room, are adjusted during a same time period.

9. The method of claim 8, wherein:

the rack installation rate at which rack computer systems are installed in the particular computer room, and the rack installation rate at which rack computer systems are installed in the separate computer room, are each adjusted in equal and opposite magnitudes.

10. The method of claim 7, wherein:
adjusting the rack installation rate at which rack computer systems are installed in a separate computer room comprises initiating installation of rack computer systems in the at least one separate computer room.

11. The method of claim 7, wherein:
the rack computer systems installed in the particular computer room, and the rack computer systems installed in the at least one separate computer room, each consume electrical power supplied by a separate power distribution system, of a plurality of power distribution systems.

12. The method of claim 5, wherein:
the particular computer room comprises a predetermined set of rack positions which are configured to accommodate a particular quantity of installed rack computer systems; and
the method comprises:
  initiating installation of additional rack computer systems in an additional space which comprises an additional set of rack positions, such that the installed additional rack computer systems in the additional space and the installed rack computer systems in the particular computer room consume electrical power supplied by a common power distribution system, based at least in part upon a determination that both:
    a quantity of installed rack computer systems in the particular computer room matches the particular quantity, and
    an available power supply capacity of the common power distribution system at least meets a certain threshold level.

13. The method claim 12, wherein the method comprises:
initiating installation of an additional power distribution system in a predetermined expansion area, such that the additional power distribution system is configured to supply electrical power consumed by the additional rack computer systems installed in the additional space, based at least in part upon at least a determination that the available power supply capacity of the common power distribution system is less than the certain threshold level.

14. The method of claim 5, wherein:
the determination that the electrical power consumption by the installed rack computer systems in the particular computer room at least meets a particular threshold value comprises a determination that the electrical power consumption at least meets a particular proportion of a power supply capacity of a power distribution system supplying electrical power consumed by the installed rack computer systems.

15. An apparatus, comprising:
a computer system communicatively coupled to a power distribution system, wherein the power distribution system is configured to supply electrical power to installed rack computer systems in a particular computer room of a plurality of computer rooms, wherein the computer system is configured to:
  monitor a rate at which rack computer systems are installed in the particular computer room;
  monitor electrical power consumption, of the electrical power supplied by the power distribution system, by the installed rack computer systems in the particular computer room; and
  adjust the rate at which rack computer systems are installed in the particular computer room to a different rate, in response to a determination, by the computer system, that the electrical power consumption by the installed rack computer systems in the particular computer room exceeds at least one threshold value, wherein, to adjust the rate to the different rate, the computer system accounts for an adjustment to a rate at which rack computer systems are installed in at least one other computer room of the plurality of computer rooms, such that a total rate at which rack computer systems are installed in the plurality of computer rooms is unchanged.

16. The apparatus of claim 15, wherein the computer system is configured to:
adjust the rate at which rack computer systems are installed in the particular computer room, based at least in part upon a determined rate at which the electrical power consumption changes over a particular period of elapsed time.

17. The apparatus of claim 15, wherein the computer system is configured to:
adjust the rate at which rack computer systems are installed in the at least one other computer room, based at least in part upon the determination that the electrical power consumption by the installed rack computer systems in the particular computer room exceeds at least one threshold value.

18. The apparatus of claim 15, wherein:
to adjust the rate at which rack computer systems are installed in the at least one other computer room, the computer system is configured to command an initiation of installation of rack computer systems in the at least one other computer room.

19. The apparatus of claim 15, wherein:
the computer room is restricted to accommodating up to a particular quantity of installed rack computer systems; and
the computer system is configured to:
  initiate installation of additional rack computer systems in an additional space which comprises an additional set of rack positions, such that the installed additional rack computer systems consume electrical power supplied by the power distribution system, based at least in part upon a determination that both:
    the particular quantity of installed rack computer systems are installed in the particular computer room, and
    the electrical power consumption, of the electrical power supplied by the power distribution system, by the installed rack computer systems in the particular computer room, is less than a certain proportion of a power supply capacity of the power distribution system.

20. The apparatus of claim 15, wherein:
the determination that the electrical power consumption by the installed rack computer systems in the particular computer room exceeds at least one threshold value comprises a determination that the electrical power consumption at least meets a particular proportion of a power supply capacity of the power distribution system.

* * * * *